US009715559B2

(12) United States Patent
Pang et al.

(10) Patent No.: US 9,715,559 B2
(45) Date of Patent: Jul. 25, 2017

(54) HASH-BASED ENCODER SEARCH FOR INTRA BLOCK COPY

(71) Applicant: QUALCOMM Incorporated, San Diego, CA (US)

(72) Inventors: Chao Pang, San Diego, CA (US); Xiang Li, San Diego, CA (US); Joel Sole Rojals, La Jolla, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 367 days.

(21) Appl. No.: 14/659,398

(22) Filed: Mar. 16, 2015

(65) Prior Publication Data
US 2015/0261884 A1 Sep. 17, 2015

Related U.S. Application Data

(60) Provisional application No. 61/954,449, filed on Mar. 17, 2014.

(51) Int. Cl.
*G06F 17/30* (2006.01)
*H04N 19/105* (2014.01)
(Continued)

(52) U.S. Cl.
CPC .. *G06F 17/30949* (2013.01); *G06F 17/30958* (2013.01); *H04N 19/105* (2014.11);
(Continued)

(58) Field of Classification Search
CPC ........ G06F 17/30958; G06F 17/30949; H04N 19/105; H04N 19/136; H04N 19/18;
(Continued)

(56) References Cited

U.S. PATENT DOCUMENTS 9,210,424 B1 * 12/2015 Rintaluoma ......... H04N 19/176
9,350,988 B1 * 5/2016 Bankoski ......... H04N 19/00018
(Continued)

FOREIGN PATENT DOCUMENTS

JP 2010251877 A 11/2010
WO WO-02093934 A1 11/2002
(Continued)

OTHER PUBLICATIONS

Liu, Shan, et al., "Video Prediction Block Structure and the Emerging High Efficiency Video Coding Standard", APSIPA ASC 2012, Hollywood, CA, Dec. 3-6, 2012, 4 pages.*
(Continued)

*Primary Examiner* — Robert Stevens
(74) *Attorney, Agent, or Firm* — Knobbe, Martens, Olson & Bear, LLP

(57) ABSTRACT

An apparatus configured to encode video information of a picture includes a memory unit and a processor in communication with the memory unit. The memory unit is configured to store a hash table that includes at least one hash index corresponding to reference blocks in the picture, the reference blocks being a subset of available blocks in the picture. The processor is configured to map a current block to a hash index in the hash table based on the application of a hash function to the current block, identify, from the hash table, reference blocks that correspond to the hash index, select a prediction block from among the reference blocks based on a comparison of the current block to the reference blocks, and encode the video information using the selected prediction block.

28 Claims, 8 Drawing Sheets

(51) Int. Cl.
*H04N 19/46* (2014.01)
*H04N 19/30* (2014.01)
*H04N 19/593* (2014.01)
*H04N 19/136* (2014.01)
*H04N 19/18* (2014.01)
*H04N 19/597* (2014.01)
*H04N 19/52* (2014.01)
*H04N 19/11* (2014.01)
*H04N 19/33* (2014.01)
*H04N 19/31* (2014.01)

(52) U.S. Cl.
CPC ........... *H04N 19/136* (2014.11); *H04N 19/18* (2014.11); *H04N 19/30* (2014.11); *H04N 19/46* (2014.11); *H04N 19/593* (2014.11); *H04N 19/11* (2014.11); *H04N 19/31* (2014.11); *H04N 19/33* (2014.11); *H04N 19/52* (2014.11); *H04N 19/597* (2014.11)

(58) Field of Classification Search
CPC ...... H04N 19/30; H04N 19/46; H04N 19/593; H04N 19/597; H04N 19/52; H04N 19/11; H04N 19/31; H04N 19/33
USPC .......................................................... 707/741
See application file for complete search history.

(56) References Cited

U.S. PATENT DOCUMENTS

| | | | | |
|---|---|---|---|---|
| 9,438,910 | B1* | 9/2016 | Han | H04N 19/00733 |
| 9,485,512 | B2* | 11/2016 | Kim | H04N 19/176 |
| 2007/0110160 | A1* | 5/2007 | Wang | H04N 19/56 375/240.16 |
| 2013/0272409 | A1* | 10/2013 | Seregin | H04N 19/0066 375/240.16 |
| 2014/0098855 | A1* | 4/2014 | Gu | H04N 19/139 375/240.03 |
| 2016/0234530 | A1* | 8/2016 | Xu | H04N 19/503 |
| 2016/0241876 | A1* | 8/2016 | Xu | H04N 1/4466 |
| 2016/0269732 | A1* | 9/2016 | Li | H04N 19/593 |
| 2016/0277733 | A1* | 9/2016 | Li | H04N 19/593 |
| 2016/0277761 | A1* | 9/2016 | Li | H04N 19/124 |

FOREIGN PATENT DOCUMENTS

| | | | |
|---|---|---|---|
| WO | WO-2013155424 | A1 | 10/2013 |
| WO | WO-2015058395 | A1 | 4/2015 |
| WO | WO-2015131325 | A1 | 9/2015 |
| WO | WO-2015131326 | A1 | 9/2015 |

OTHER PUBLICATIONS

International Search Report and Written Opinion—PCT/US2015/020936—ISA/EPO—Jun. 10, 2015, 13 pages.

Puri R. et al., "PRISM: A Video Coding Paradigm With Motion Estimation at the Decoder", IEEE Transactions on Image Processing, IEEE Service Center, Piscataway, NJ, US, vol. 16, No. 10, Oct. 1, 2007 (Oct. 1, 2007), pp. 2436-2448, XP011192113.

Tagliasacchi M. et al., "Hash-Based Motion Modeling in Wyner-Ziv Video Coding", 2007 IEEE International Conference on Acoustics, Speech, and Signal Processing Apr. 15-20, 2007 Honolulu, HI, USA, IEEE, Piscataway, NJ, USA, Apr. 15, 2007 (Apr. 15, 2007), pp. 1-509 to 1-512; XP031462910.

Wang Q. et al., "Intracoding and Refresh With Compression-Oriented Video Epitomic Priors", IEEE Transactions on Circuits and Systems for Video Technology, IEEE Service Center, Piscataway, NJ, US, vol. 22, No. 5, May 1, 2012 (May 1, 2012), pp. 714-726, XP011443100.

Yu S.-L. et al., "New Intra Prediction using Intra-Macroblock Motion Compensation", Joint Video Team (JVT) of ISO/IEC MPEG & ITU-T VCEG ISO/IEC JTC1/SC29/WG11 and ITU-T SG16 06), May 6, 2002 (May 6, 2002), pp. 1-10, XP002324083.

Wu Y. et al., "Two-pass hexagonal algorithm with improved hashtable structure for motion estimation", Proceedings. IEEE Conference on Advanced Video and Signal Based Surveillance, 2005. Como, Italy Sep. 15-16, 2005, Piscataway, NJ, USA,IEEE, Piscataway, NJ, USA, Sep. 15, 2005 (Sep. 15, 2005), pp. 564-569, XP010881237.

* cited by examiner

HASH-BASED ENCODER SEARCH FOR INTRA BLOCK COPY

INCORPORATION BY REFERENCE TO PRIORITY APPLICATION(S)

This application claims the benefit of U.S. Provisional Application No. 61/954,449, filed Mar. 17, 2014.

BACKGROUND

Technical Field

This disclosure relates generally to the field of video coding and compression, and particularly to Intra Block Copy (Intra BC) in the context of video codecs.

Description of the Related Art

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by Moving Picture Experts Group-2 (MPEG-2), MPEG-4, International Telegraph Union-Telecommunication Standardization Sector (ITU-T) H.263, ITU-T H.264/MPEG-4, Part 10, Advanced Video Coding (AVC), the High Efficiency Video Coding (HEVC) standard, and extensions of such standards. The video devices may transmit, receive, encode, decode, and/or store digital video information more efficiently by implementing such video coding techniques.

Video compression techniques perform spatial (intra-picture) prediction and/or temporal (inter-picture) prediction to reduce or remove redundancy inherent in video sequences. For block-based video coding, a video slice may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

The systems, methods and devices of this disclosure each have several innovative aspects, no single one of which is solely responsible for the desirable attributes disclosed herein.

In one aspect, an apparatus for encoding video information of a picture comprises a memory unit configured to store a hash table that includes at least one hash index corresponding to reference blocks in the picture, the reference blocks being a subset of available blocks in the picture, and a processor operationally coupled to the memory unit and configured to map a current block to a hash index in the hash table based on the application of a hash function to the current block, identify, from the hash table, reference blocks that correspond to the hash index, select a prediction block from among the reference blocks based on a comparison of the current block to the reference blocks, and encode the video information using the selected prediction block.

In another aspect, a method for encoding video information of a picture comprises storing, in a memory unit, a hash table that includes at least one hash index corresponding to reference blocks in the picture, the reference blocks being a subset of available blocks in the picture, mapping a current block to a hash index in the hash table based on the application of a hash function to the current block, identifying, from the hash table, reference blocks that correspond to the hash index, selecting a prediction block from among the reference blocks based on a comparison of the current block to the reference blocks, and encoding the video information using the selected prediction block.

In another aspect, a non-transitory computer readable storage medium has stored thereon instructions that, when executed, cause a processor of a device to store in a memory unit a hash table for use in encoding video information of a picture, the hash table comprising at least one hash index corresponding to reference blocks in the picture, the reference blocks being a subset of available blocks in the picture, map a current block to a hash index in the hash table based on the application of a hash function to the current block, identify, from the hash table, reference blocks that correspond to the hash index, select a prediction block from among the reference blocks based on a comparison of the current block to the reference blocks, and encode the video information using the selected prediction block.

In yet another aspect, a video coding device configured to encode video information of a picture comprises means for storing a hash table that includes at least one hash index corresponding to reference blocks in the picture, the reference blocks being a subset of available blocks in the picture, means for mapping a current block to a hash index in the hash table based on the application of a hash function to the current block, means for identifying, from the hash table, reference blocks that correspond to the hash index, means for selecting a prediction block from among the reference blocks based on a comparison of the current block to the reference blocks, and means for encoding the video information using the selected prediction block.

DETAILED DESCRIPTION

Figure 1A:
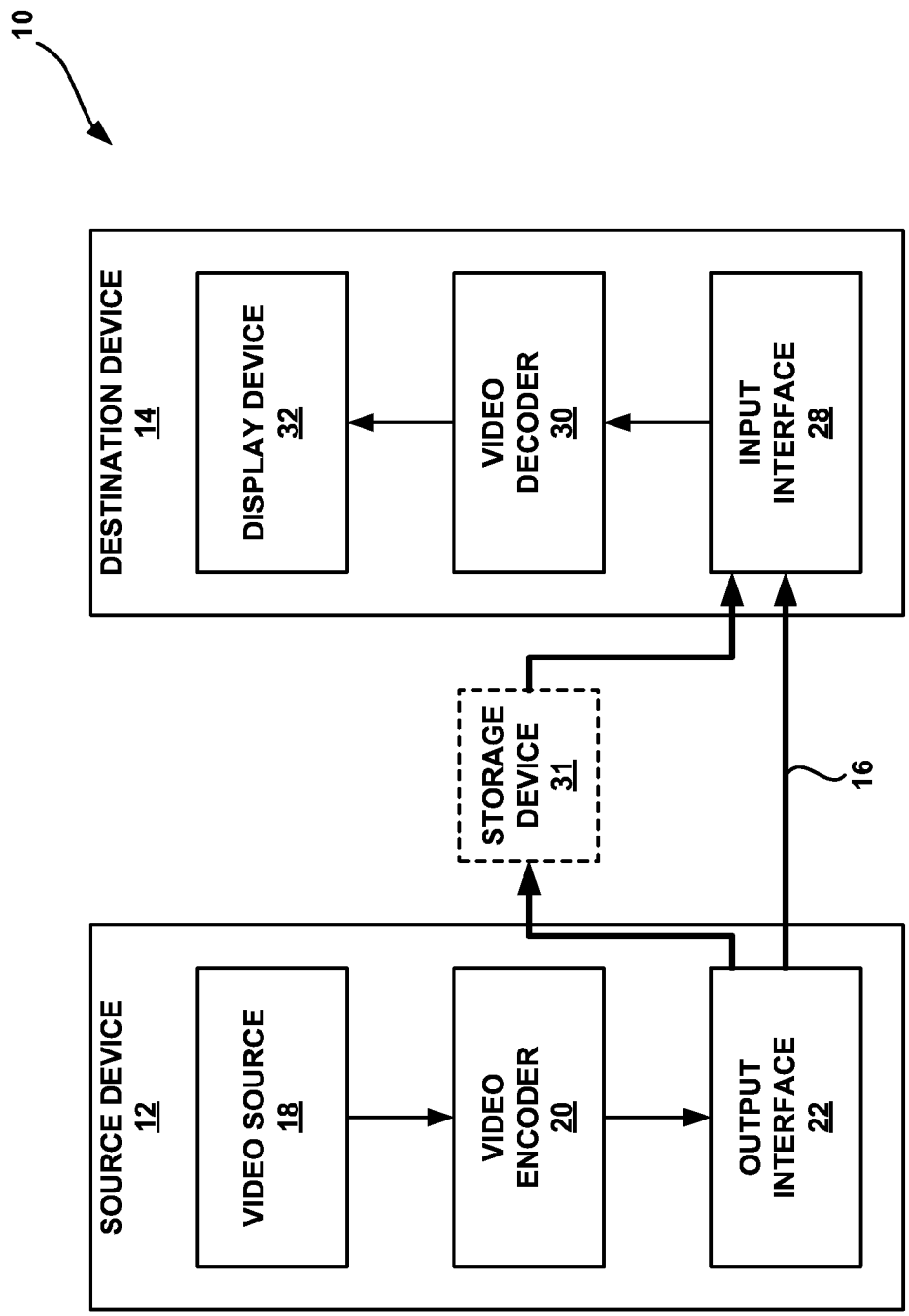
FIG. 1A is a block diagram illustrating an example video encoding and decoding system that may utilize techniques in accordance with aspects described in this disclosure.

In general, this disclosure relates to Intra Block Copy (Intra BC) in the context of advanced video codecs, such as High Efficiency Video Coding (HEVC). As one example, the present disclosure relates to improved encoder searching for Intra BC in the Range Extensions (RExt) to HEVC. However, the techniques should not be considered limited to the HEVC standard or its Range extensions.

Use of applications, such as remote desktop, remote gaming, wireless displays, automotive infotainment, cloud computing, etc., have become more prevalent. Video content in these applications are usually combinations of natural content as well as text, artificial graphics, etc. (also referred to as non-natural content) within the same picture. In the text and the artificial graphics regions, repeated patterns (e.g., characters, icons, symbols, etc.) often exist. Intra BC is a dedicated technique which involves removing redundancies due to such repeated patterns and improving intra-frame coding efficiency. More specifically, Intra BC is block matching technique in which a current coding unit (CU) or a current prediction unit (PU) is predicted based on another previously reconstructed block from another region within the same picture or same slice.

To find a suitable reconstructed block, an encoder typically performs a search on an entire search region, which may be an entire frame of video information. Various methods have been proposed for improving searching speed for Intra BC. However, these methods may not be effective if the search region is large (e.g., an entire frame). This is because a large search region may contain many blocks, each of which may have to be individually checked during Intra BC.

Embodiments of the present disclosure provide advantages which address the issues in previous Intra BC methods by providing techniques for encoding video information of a picture through use of a hash table. The hash table may include at least one hash index corresponding to a subset of previously reconstructed blocks in the picture. A current block may then be mapped to a hash index through use of a hash function, and Intra BC may be restricted to reconstructed blocks which correspond to the hash index that the current block was mapped to. Thus, such embodiments are suitable for limiting the encoder search for Intra BC to specific reconstructed blocks rather than an entire search region.

Investigation of new coding tools for screen content material, such as text and graphics with motion, is desired. Certain technologies that improve the coding efficiency for screen content are described below. Improvements in coding efficiency can be achieved by exploiting the characteristics of screen content with dedicated coding tools. Provided herein are extensions of the HEVC standard, including specific tools for screen content coding.

While certain embodiments are described herein in the context of the HEVC and/or H.264 standards, one having ordinary skill in the art may appreciate that systems and methods disclosed herein may be applicable to any suitable video coding standard. For example, embodiments disclosed herein may be applicable to one or more of the following standards: International Telecommunication Union (ITU) Telecommunication Standardization Sector (ITU-T) H.261, International Organization for Standardization/International Electrotechnical Commission (IS O/IEC) MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including the scalable and multi-view extensions. Also, the techniques described in this disclosure may become part of standards developed in the future. In other words, the techniques described in this disclosure may be applicable to previously developed video coding standards, video coding standards currently under development, and forthcoming video coding standards.

HEVC generally follows the framework of previous video coding standards in many respects. The unit of prediction in HEVC is different from the units of prediction (e.g., macroblocks) in certain previous video coding standards. In fact, the concept of a macroblock does not exist in HEVC as understood in certain previous video coding standards. A macroblock is replaced by a hierarchical structure based on a quadtree scheme, which may provide high flexibility, among other possible benefits. For example, within the HEVC scheme, three types of blocks, CU, PU, and transform unit (TU), are defined. CU may refer to the basic unit of region splitting. CU may be considered analogous to the concept of macroblock, but HEVC does not restrict the maximum size of CUs and may allow recursive splitting into four equal size CUs to improve the content adaptivity. PU may be considered the basic unit of inter/intra prediction, and a single PU may contain multiple arbitrary shape partitions to effectively code irregular image patterns. TU may be considered the basic unit of transform. TU can be defined independently from the PU; however, the size of a TU may be limited to the size of the CU to which the TU belongs. This separation of the block structure into three different concepts may allow each unit to be optimized according to the respective role of the unit, which may result in improved coding efficiency.

For purposes of illustration only, certain embodiments disclosed herein are described with examples including only two layers (e.g., a lower layer such as the base layer, and a higher layer such as the enhancement layer) of video data. A "layer" of video data may generally refer to a sequence of pictures having at least one common characteristic, such as a view, a frame rate, a resolution, or the like. For example, a layer may include video data associated with a particular view (e.g., perspective) of multi-view video data. As another example, a layer may include video data associated with a particular layer of scalable video data. Thus, this disclosure may interchangeably refer to a layer and a view of video data. That is, a view of video data may be referred to as a layer of video data, and a layer of video data may be referred to as a view of video data. In addition, a multi-layer codec (also referred to as a multi-layer video coder or multi-layer encoder-decoder) may jointly refer to a multiview codec or a scalable codec (e.g., a codec configured to encode and/or decode video data using MV-HEVC, 3D-HEVC, SHVC, or another multi-layer coding technique). Video encoding and video decoding may both generally be referred to as video coding. It should be understood that such examples may be applicable to configurations including multiple base and/or enhancement layers. In addition, for ease of explanation, the following disclosure includes the terms "frames" or "blocks" with reference to certain embodiments. However, these terms are not meant to be limiting. For example, the techniques described below can be used with any suitable video units, such as blocks (e.g., CU, PU, TU, macroblocks, etc.), slices, frames, etc.

Video Coding Standards

A digital image, such as a video image, a TV image, a still image or an image generated by a video recorder or a computer, may consist of pixels or samples arranged in horizontal and vertical lines. The number of pixels in a single image is typically in the tens of thousands. Each pixel typically contains luminance and chrominance information. Without compression, the sheer quantity of information to be conveyed from an image encoder to an image decoder would render real-time image transmission impossible. To reduce the amount of information to be transmitted, a number of different compression methods, such as JPEG, MPEG and H.263 standards, have been developed.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including the scalable and multiview extensions.

In addition, a video coding standard, namely HEVC, has been developed by the Joint Collaboration Team on Video Coding (JCT-VC) of ITU-T Video Coding Experts Group (VCEG) and ISO/IEC MPEG. The full citation for the HEVC Draft 10 is document JCTVC-L1003, Bross et al., "High Efficiency Video Coding (HEVC) Text Specification Draft 10," Joint Collaborative Team on Video Coding (JCT-VC) of ITU-T SG16 WP3 and ISO/IEC JTC1/SC29/WG11, 12th Meeting: Geneva, Switzerland, Jan. 14, 2013 to Jan. 23, 2013. The multiview extension to HEVC, namely MV-HEVC, and the scalable extension to HEVC, named SHVC, are also being developed by the JCT-3V (ITU-T/ISO/IEC Joint Collaborative Team on 3D Video Coding Extension Development) and JCT-VC, respectively.

Video Coding System

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the present disclosure. For example, an apparatus may be implemented or a method may be practiced using any number of the aspects set forth herein. In addition, the scope of the present disclosure is intended to cover such an apparatus or method which is practiced using other structure, functionality, or structure and functionality in addition to or other than the various aspects of the present disclosure set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words are merely used to refer to different elements of a same or similar type.

FIG. 1A is a block diagram that illustrates an example video coding system 10 that may utilize techniques in accordance with aspects described in this disclosure. As used described herein, the term "video coder" refers generically to both video encoders and video decoders. In this disclosure, the terms "video coding" or "coding" may refer generically to video encoding and video decoding. In addition to video encoders and video decoders, the aspects described in the present application may be extended to other related devices such as transcoders (e.g., devices that can decode a bitstream and re-encode another bitstream) and middleboxes (e.g., devices that can modify, transform, and/or otherwise manipulate a bitstream).

Figure 1B:
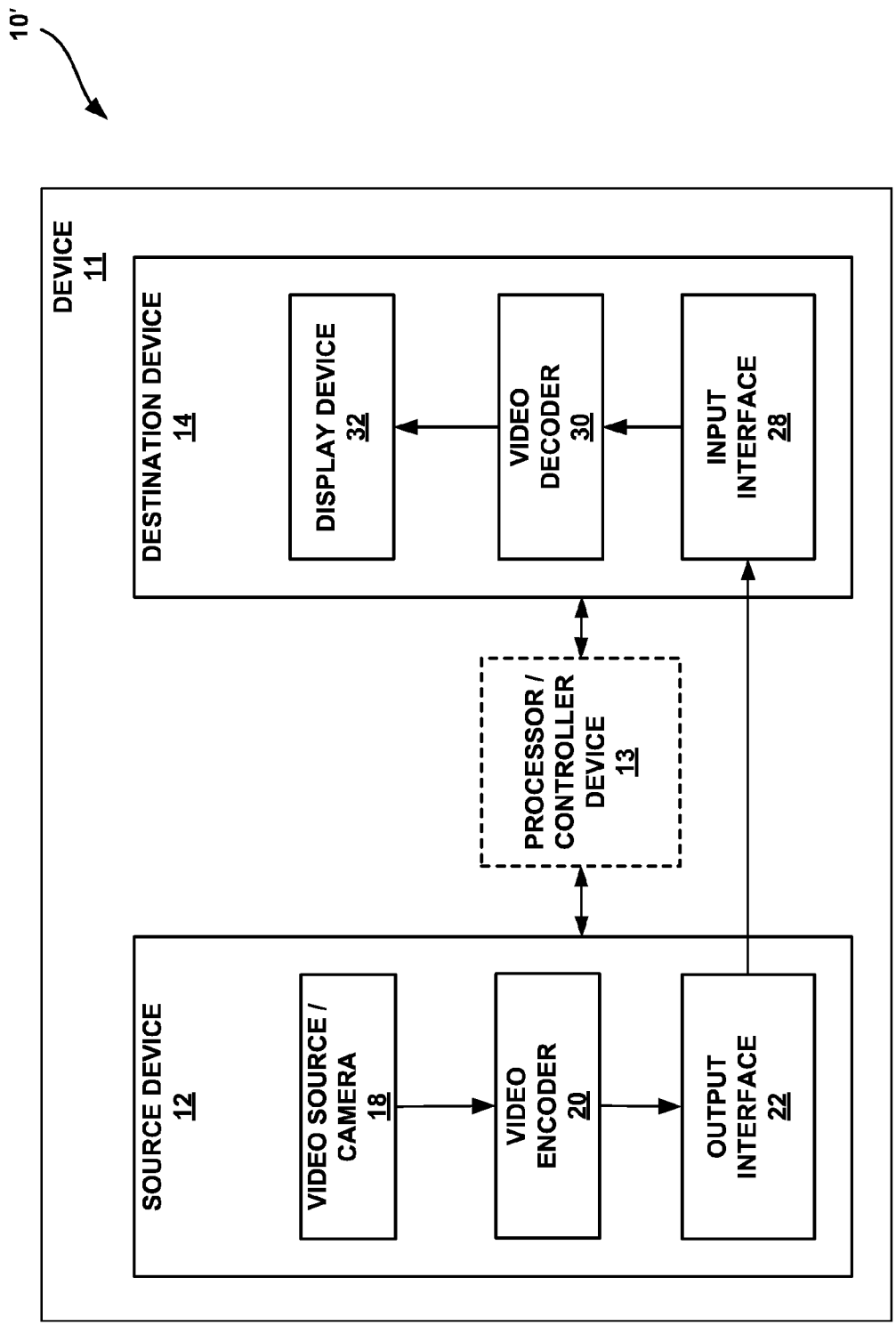
FIG. 1B is a block diagram illustrating another example video encoding and decoding system that may perform techniques in accordance with aspects described in this disclosure.

As shown in FIG. 1A, video coding system 10 includes a source device 12 that generates encoded video data to be decoded at a later time by a destination device 14. In the example of FIG. 1A, the source device 12 and destination device 14 constitute separate devices. It is noted, however, that the source device 12 and destination device 14 may be on or part of the same device, as shown in the example of FIG. 1B.

With reference once again, to FIG. 1A, the source device 12 and the destination device 14 may respectively comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, video streaming device, or the like. In various embodiments, the source device 12 and the destination device 14 may be equipped for wireless communication.

The destination device 14 may receive, via link 16, the encoded video data to be decoded. The link 16 may comprise any type of medium or device capable of moving the encoded video data from the source device 12 to the destination device 14. In the example of FIG. 1A, the link 16 may comprise a communication medium to enable the source device 12 to transmit encoded video data to the destination device 14 in real-time. The encoded video data may be modulated according to a communication standard, such as a wireless communication protocol, and transmitted to the destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

Alternatively, encoded data may be output from an output interface 22 to an a storage device 31 (optionally present). Similarly, encoded data may be accessed from the storage device 31 by an input interface 28, for example, of the destination device 14. The storage device 31 may include any of a variety of distributed or locally accessed data storage media such as a hard drive, flash memory, volatile or non-volatile memory, or any other suitable digital storage media for storing encoded video data. In a further example, the storage device 31 may correspond to a file server or another intermediate storage device that may hold the encoded video generated by the source device 12. The destination device 14 may access stored video data from the storage device 31 via streaming or download. The file server may be any type of server capable of storing encoded video data and transmitting that encoded video data to the destination device 14. Example file servers include a web server (e.g., for a website), a File Transfer Protocol (FTP) server, network attached storage (NAS) devices, or a local disk drive. The destination device 14 may access the encoded video data through any standard data connection, including an Internet connection. This may include a wireless channel (e.g., a wireless local area network (WLAN) connection), a wired connection (e.g., a digital subscriber line (DSL), a cable modem, etc.), or a combination of both that is suitable for accessing encoded video data stored on a file server. The transmission of encoded video data from the storage device 31 may be a streaming transmission, a download transmission, or a combination of both.

The techniques of this disclosure are not limited to wireless applications or settings. The techniques may be applied to video coding in support of any of a variety of multimedia applications, such as over-the-air television broadcasts, cable television transmissions, satellite television transmissions, streaming video transmissions, e.g., via the Internet (e.g., dynamic adaptive streaming over Hypertext Transfer Protocol (HTTP), etc.), encoding of digital video for storage on a data storage medium, decoding of digital video stored on a data storage medium, or other applications. In some examples, video coding system 10 may be configured to support one-way or two-way video transmission to support applications such as video streaming, video playback, video broadcasting, and/or video telephony.

In the example of FIG. 1A, the source device 12 includes a video source 18, video encoder 20 and the output interface 22. In some cases, the output interface 22 may include a modulator/demodulator (modem) and/or a transmitter. In the source device 12, the video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if the video source 18 is a video camera, the source device 12 and the destination device 14 may form so-called "camera phones" or "video phones", as illustrated in the example of FIG. 1B. However, the techniques described in this disclosure may be applicable to video coding in general, and may be applied to wireless and/or wired applications.

The captured, pre-captured, or computer-generated video may be encoded by the the video encoder 20. The encoded video data may be transmitted to the destination device 14 via the output interface 22 of the source device 12. The encoded video data may also (or alternatively) be stored onto the storage device 31 for later access by the destination device 14 or other devices, for decoding and/or playback. The video encoder 20 illustrated in FIGS. 1A and 1B may comprise the video encoder 20 illustrated FIG. 2A, the video encoder 23 illustrated in FIG. 2B, or any other video encoder described herein.

In the example of FIG. 1A, the destination device 14 includes the input interface 28, a video decoder 30, and a display device 32. In some cases, the input interface 28 may include a receiver and/or a modem. The input interface 28 of the destination device 14 may receive the encoded video data over the link 16 and/or from the storage device 31. The encoded video data communicated over the link 16, or provided on the storage device 31, may include a variety of syntax elements generated by the video encoder 20 for use by a video decoder, such as the video decoder 30, in decoding the video data. Such syntax elements may be included with the encoded video data transmitted on a communication medium, stored on a storage medium, or stored a file server. The video decoder 30 illustrated in FIGS. 1A and 1B may comprise the video decoder 30 illustrated FIG. 3A, the video decoder 33 illustrated in FIG. 3B, or any other video decoder described herein.

The display device 32 may be integrated with, or external to, the destination device 14. In some examples, the destination device 14 may include an integrated display device and also be configured to interface with an external display device. In other examples, the destination device 14 may be a display device. In general, the display device 32 displays the decoded video data to a user, and may comprise any of a variety of display devices such as a liquid crystal display (LCD), a plasma display, an organic light emitting diode (OLED) display, or another type of display device.

In related aspects, FIG. 1B shows an example video coding system 10' wherein the source device 12 and the destination device 14 are on or part of a device 11. The device 11 may be a telephone handset, such as a "smart" phone or the like. The device 11 may include a controller/processor device 13 (optionally present) in operative communication with the source device 12 and the destination device 14. The video coding system 10' of FIG. 1B, and components thereof, are otherwise similar to the video coding system 10 of FIG. 1A, and components thereof.

The video encoder 20 and the video decoder 30 may operate according to a video compression standard, such as HEVC, and may conform to a HEVC Test Model (HM). Alternatively, the video encoder 20 and the video decoder 30 may operate according to other proprietary or industry standards, such as the ITU-T H.264 standard, alternatively referred to as MPEG-4, Part 10, AVC, or extensions of such standards. The techniques of this disclosure, however, are not limited to any particular coding standard. Other examples of video compression standards include MPEG-2 and ITU-T H.263.

Although not shown in the examples of FIGS. 1A and 1B, the video encoder 20 and the video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

The video encoder 20 and the video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of the video encoder 20 and the video decoder 30 may be included in one or more encoders or decoders, either of which may be integrated as part of a combined encoder/decoder in a respective device.

Video Coding Process

As mentioned briefly above, the video encoder 20 encodes video data. The video data may comprise one or more pictures. Each of the pictures is a still image forming part of a video. In some instances, a picture may be referred to as a video "frame." When the video encoder 20 encodes the video data, the video encoder 20 may generate a bitstream. The bitstream may include a sequence of bits that form a coded representation of the video data. The bitstream may include coded pictures and associated data. A coded picture is a coded representation of a picture.

To generate the bitstream, the video encoder 20 may perform encoding operations on each picture in the video data. When the video encoder 20 performs encoding operations on the pictures, the video encoder 20 may generate a series of coded pictures and associated data. The associated data may include video parameter sets (VPS), sequence parameter sets (SPSs), picture parameter sets (PPSs), adaptation parameter sets (APSs), and other syntax structures. An SPS may contain parameters applicable to zero or more sequences of pictures. An PPS may contain parameters applicable to zero or more pictures. An APS may contain parameters applicable to zero or more pictures. Parameters in an APS may be parameters that are more likely to change than parameters in a PPS.

To generate a coded picture, the video encoder 20 may partition a picture into equally-sized video blocks. A video block may be a two-dimensional array of samples. Each of the video blocks is associated with a treeblock. In some instances, a treeblock may be referred to as a largest coding unit (LCU). The treeblocks of HEVC may be broadly analogous to the macroblocks of previous standards, such as H.264/AVC. However, a treeblock is not necessarily limited to a particular size and may include one or more coding units (CUs). The video encoder 20 may use quadtree partitioning to partition the video blocks of treeblocks into video blocks associated with CUs, hence the name "treeblocks."

In some examples, the video encoder 20 may partition a picture into a plurality of slices. Each of the slices may include an integer number of CUs. In some instances, a slice comprises an integer number of treeblocks. In other instances, a boundary of a slice may be within a treeblock.

As part of performing an encoding operation on a picture, the video encoder 20 may perform encoding operations on each slice of the picture. When the video encoder 20 performs an encoding operation on a slice, the video encoder 20 may generate encoded data associated with the slice. The encoded data associated with the slice may be referred to as a "coded slice."

To generate a coded slice, the video encoder 20 may perform encoding operations on each treeblock in a slice. When the video encoder 20 performs an encoding operation on a treeblock, the video encoder 20 may generate a coded treeblock. The coded treeblock may comprise data representing an encoded version of the treeblock.

When the video encoder 20 generates a coded slice, the video encoder 20 may perform encoding operations on (e.g., encode) the treeblocks in the slice according to a raster scan order. For example, the video encoder 20 may encode the treeblocks of the slice in an order that proceeds from left to right across a topmost row of treeblocks in the slice, then from left to right across a next lower row of treeblocks, and so on until the video encoder 20 has encoded each of the treeblocks in the slice.

As a result of encoding the treeblocks according to the raster scan order, the treeblocks above and to the left of a given treeblock may have been encoded, but treeblocks below and to the right of the given treeblock have not yet been encoded. Consequently, the video encoder 20 may be able to access information generated by encoding treeblocks above and to the left of the given treeblock when encoding the given treeblock. However, the video encoder 20 may be unable to access information generated by encoding treeblocks below and to the right of the given treeblock when encoding the given treeblock.

To generate a coded treeblock, the video encoder 20 may recursively perform quadtree partitioning on the video block of the treeblock to divide the video block into progressively smaller video blocks. Each of the smaller video blocks may be associated with a different CU. For example, the video encoder 20 may partition the video block of a treeblock into four equally-sized sub-blocks, partition one or more of the sub-blocks into four equally-sized sub-sub-blocks, and so on. A partitioned CU may be a CU whose video block is partitioned into video blocks associated with other CUs. A non-partitioned CU may be a CU whose video block is not partitioned into video blocks associated with other CUs.

One or more syntax elements in the bitstream may indicate a maximum number of times the video encoder 20 may partition the video block of a treeblock. A video block of a CU may be square in shape. The size of the video block of a CU (e.g., the size of the CU) may range from 8×8 pixels up to the size of a video block of a treeblock (e.g., the size of the treeblock) with a maximum of 64×64 pixels or greater.

The video encoder 20 may perform encoding operations on (e.g., encode) each CU of a treeblock according to a z-scan order. In other words, the video encoder 20 may encode a top-left CU, a top-right CU, a bottom-left CU, and then a bottom-right CU, in that order. When the video encoder 20 performs an encoding operation on a partitioned CU, the video encoder 20 may encode CUs associated with sub-blocks of the video block of the partitioned CU according to the z-scan order. In other words, the video encoder 20 may encode a CU associated with a top-left sub-block, a CU associated with a top-right sub-block, a CU associated with a bottom-left sub-block, and then a CU associated with a bottom-right sub-block, in that order.

As a result of encoding the CUs of a treeblock according to a z-scan order, the CUs above, above-and-to-the-left, above-and-to-the-right, left, and below-and-to-the left of a given CU may have been encoded. CUs below and to the right of the given CU have not yet been encoded. Consequently, the video encoder 20 may be able to access information generated by encoding some CUs that neighbor the given CU when encoding the given CU. However, the video encoder 20 may be unable to access information generated by encoding other CUs that neighbor the given CU when encoding the given CU.

When the video encoder 20 encodes a non-partitioned CU, the video encoder 20 may generate one or more prediction units (PUs) for the CU. Each of the PUs of the CU may be associated with a different video block within the video block of the CU. The video encoder 20 may generate a predicted video block for each PU of the CU. The predicted video block of a PU may be a block of samples. The video encoder 20 may use intra prediction or inter prediction to generate the predicted video block for a PU.

When the video encoder 20 uses intra prediction to generate the predicted video block of a PU, the video encoder 20 may generate the predicted video block of the PU based on decoded samples of the picture associated with the PU. If the video encoder 20 uses intra prediction to generate predicted video blocks of the PUs of a CU, the CU is an intra-predicted CU. When the video encoder 20 uses inter prediction to generate the predicted video block of the PU, the video encoder 20 may generate the predicted video block of the PU based on decoded samples of one or more pictures other than the picture associated with the PU. If the video encoder 20 uses inter prediction to generate predicted video blocks of the PUs of a CU, the CU is an inter-predicted CU.

Furthermore, when the video encoder 20 uses inter prediction to generate a predicted video block for a PU, the video encoder 20 may generate motion information for the PU. The motion information for a PU may indicate one or more reference blocks of the PU. Each reference block of the PU may be a video block within a reference picture. The reference picture may be a picture other than the picture associated with the PU. In some instances, a reference block of a PU may also be referred to as the "reference sample" of the PU. The video encoder 20 may generate the predicted video block for the PU based on the reference blocks of the PU.

After the video encoder 20 generates predicted video blocks for one or more PUs of a CU, the video encoder 20 may generate residual data for the CU based on the predicted video blocks for the PUs of the CU. The residual data for the CU may indicate differences between samples in the predicted video blocks for the PUs of the CU and the original video block of the CU.

Furthermore, as part of performing an encoding operation on a non-partitioned CU, the video encoder 20 may perform recursive quadtree partitioning on the residual data of the CU to partition the residual data of the CU into one or more blocks of residual data (e.g., residual video blocks) associated with transform units (TUs) of the CU. Each TU of a CU may be associated with a different residual video block.

The video encoder 20 may apply one or more transforms to residual video blocks associated with the TUs to generate transform coefficient blocks (e.g., blocks of transform coefficients) associated with the TUs. Conceptually, a transform coefficient block may be a two-dimensional (2D) matrix of transform coefficients.

After generating a transform coefficient block, the video encoder 20 may perform a quantization process on the transform coefficient block. Quantization generally refers to a process in which transform coefficients are quantized to possibly reduce the amount of data used to represent the transform coefficients, providing further compression. The quantization process may reduce the bit depth associated with some or all of the transform coefficients. For example, an n-bit transform coefficient may be rounded down to an m-bit transform coefficient during quantization, where n is greater than m.

The video encoder 20 may associate each CU with a quantization parameter (QP) value. The QP value associated with a CU may determine how the video encoder 20 quantizes transform coefficient blocks associated with the CU. The video encoder 20 may adjust the degree of quantization applied to the transform coefficient blocks associated with a CU by adjusting the QP value associated with the CU.

After the video encoder 20 quantizes a transform coefficient block, the video encoder 20 may generate sets of syntax elements that represent the transform coefficients in the quantized transform coefficient block. The video encoder 20 may apply entropy encoding operations, such as Context Adaptive Binary Arithmetic Coding (CABAC) operations, to some of these syntax elements. Other entropy coding techniques such as context-adaptive variable-length coding (CAVLC), probability interval partitioning entropy (PIPE) coding, or other binary arithmetic coding could also be used.

The bitstream generated by the video encoder 20 may include a series of Network Abstraction Layer (NAL) units. Each of the NAL units may be a syntax structure containing an indication of a type of data in the NAL unit and bytes containing the data. For example, a NAL unit may contain data representing a video parameter set, a sequence parameter set, a picture parameter set, a coded slice, Supplemental Enhancement Information (SEI), an access unit delimiter, filler data, or another type of data. The data in a NAL unit may include various syntax structures.

The video decoder 30 may receive the bitstream generated by the video encoder 20. The bitstream may include a coded representation of the video data encoded by the video encoder 20. When the video decoder 30 receives the bitstream, the video decoder 30 may perform a parsing operation on the bitstream. When the video decoder 30 performs the parsing operation, the video decoder 30 may extract syntax elements from the bitstream. The video decoder 30 may reconstruct the pictures of the video data based on the syntax elements extracted from the bitstream. The process to reconstruct the video data based on the syntax elements may be generally reciprocal to the process performed by the video encoder 20 to generate the syntax elements.

After the video decoder 30 extracts the syntax elements associated with a CU, the video decoder 30 may generate predicted video blocks for the PUs of the CU based on the syntax elements. In addition, the video decoder 30 may inverse quantize transform coefficient blocks associated with TUs of the CU. The video decoder 30 may perform inverse transforms on the transform coefficient blocks to reconstruct residual video blocks associated with the TUs of the CU. After generating the predicted video blocks and reconstructing the residual video blocks, the video decoder 30 may reconstruct the video block of the CU based on the predicted video blocks and the residual video blocks. In this way, the video decoder 30 may reconstruct the video blocks of CUs based on the syntax elements in the bitstream.

Video Encoder

Figure 2A:
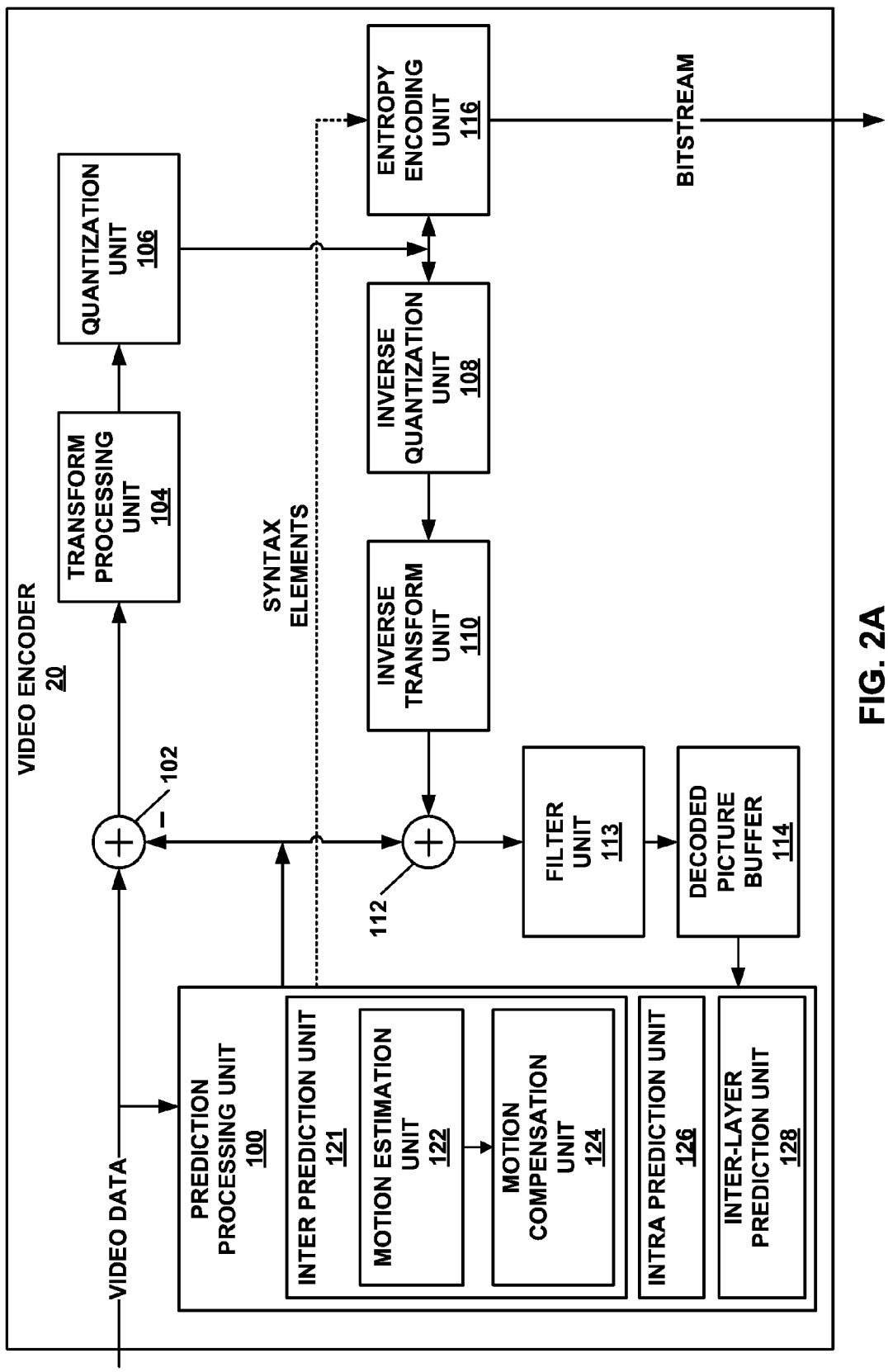
FIG. 2A is a block diagram illustrating an example of a video encoder that may implement techniques in accordance with aspects described in this disclosure.

FIG. 2A is a block diagram illustrating an example of the video encoder 20 that may implement techniques in accordance with aspects described in this disclosure. The video encoder 20 may be configured to process a single layer of a video frame, such as for HEVC. Further, the video encoder 20 may be configured to perform any or all of the techniques of this disclosure. In some examples, the techniques described in this disclosure may be shared among the various components of the video encoder 20. In some examples, additionally or alternatively, a processor (not shown) may be configured to perform any or all of the techniques described in this disclosure.

For purposes of explanation, this disclosure describes the video encoder 20 in the context of HEVC coding. However, the techniques of this disclosure may be applicable to other coding standards or methods. The example depicted in FIG. 2A is for a single layer codec. However, as will be described further with respect to FIG. 2B, some or all of the video encoder 20 may be duplicated for processing of a multi-layer codec.

The video encoder 20 may perform intra- and inter-coding of video blocks within video slices. Intra coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-directional prediction (B mode), may refer to any of several temporal-based coding modes.

In the example of FIG. 2A, the video encoder 20 includes a plurality of functional components. The functional components of the video encoder 20 include a prediction processing unit 100, a residual generation unit 102, a transform processing unit 104, a quantization unit 106, an inverse quantization unit 108, an inverse transform unit 110, a reconstruction unit 112, a filter unit 113, a decoded picture buffer 114, and an entropy encoding unit 116. Prediction processing unit 100 includes an inter prediction unit 121, a motion estimation unit 122, a motion compensation unit 124, an intra prediction unit 126, and an inter-layer prediction unit 128. In other examples, the video encoder 20 may include more, fewer, or different functional components. Furthermore, motion estimation unit 122 and motion compensation unit 124 may be highly integrated, but are represented in the example of FIG. 2A separately for purposes of explanation.

The video encoder 20 may receive video data. The video encoder 20 may receive the video data from various sources. For example, the video encoder 20 may receive the video data from video source 18 (e.g., shown in FIG. 1A or 1B) or another source. The video data may represent a series of pictures. To encode the video data, the video encoder 20 may perform an encoding operation on each of the pictures. As part of performing the encoding operation on a picture, the video encoder 20 may perform encoding operations on each slice of the picture. As part of performing an encoding operation on a slice, the video encoder 20 may perform encoding operations on treeblocks in the slice.

As part of performing an encoding operation on a treeblock, prediction processing unit 100 may perform quadtree partitioning on the video block of the treeblock to divide the video block into progressively smaller video blocks. Each of the smaller video blocks may be associated with a different CU. For example, prediction processing unit 100 may partition a video block of a treeblock into four equally-sized sub-blocks, partition one or more of the sub-blocks into four equally-sized sub-sub-blocks, and so on.

The sizes of the video blocks associated with CUs may range from 8×8 samples up to the size of the treeblock with a maximum of 64×64 samples or greater. In this disclosure, "N×N" and "N by N" may be used interchangeably to refer to the sample dimensions of a video block in terms of vertical and horizontal dimensions, e.g., 16×16 samples or 16 by 16 samples. In general, a 16×16 video block has sixteen samples in a vertical direction (y=16) and sixteen samples in a horizontal direction (x=16) Likewise, an N×N block generally has N samples in a vertical direction and N samples in a horizontal direction, where N represents a nonnegative integer value.

Furthermore, as part of performing the encoding operation on a treeblock, prediction processing unit 100 may generate a hierarchical quadtree data structure for the treeblock. For example, a treeblock may correspond to a root node of the quadtree data structure. If prediction processing unit 100 partitions the video block of the treeblock into four sub-blocks, the root node has four child nodes in the quadtree data structure. Each of the child nodes corresponds to a CU associated with one of the sub-blocks. If prediction processing unit 100 partitions one of the sub-blocks into four sub-sub-blocks, the node corresponding to the CU associated with the sub-block may have four child nodes, each of which corresponds to a CU associated with one of the sub-sub-blocks.

Each node of the quadtree data structure may contain syntax data (e.g., syntax elements) for the corresponding treeblock or CU. For example, a node in the quadtree may include a split flag that indicates whether the video block of the CU corresponding to the node is partitioned (e.g., split) into four sub-blocks. Syntax elements for a CU may be defined recursively, and may depend on whether the video block of the CU is split into sub-blocks. A CU whose video block is not partitioned may correspond to a leaf node in the quadtree data structure. A coded treeblock may include data based on the quadtree data structure for a corresponding treeblock.

The video encoder 20 may perform encoding operations on each non-partitioned CU of a treeblock. When the video encoder 20 performs an encoding operation on a non-partitioned CU, the video encoder 20 generates data representing an encoded representation of the non-partitioned CU.

As part of performing an encoding operation on a CU, prediction processing unit 100 may partition the video block of the CU among one or more PUs of the CU. The video encoder 20 and the video decoder 30 may support various PU sizes. Assuming that the size of a particular CU is 2N×2N, the video encoder 20 and the video decoder 30 may support PU sizes of 2N×2N or N×N, and inter-prediction in symmetric PU sizes of 2N×2N, 2N×N, N×2N, N×N, 2N×nU, nL×2N, nR×2N, or similar. The video encoder 20 and the video decoder 30 may also support asymmetric partitioning for PU sizes of 2N×nU, 2N×nD, nL×2N, and nR×2N. In some examples, prediction processing unit 100 may perform geometric partitioning to partition the video block of a CU among PUs of the CU along a boundary that does not meet the sides of the video block of the CU at right angles.

Inter prediction unit 121 may perform inter prediction on each PU of the CU. Inter prediction may provide temporal compression. To perform inter prediction on a PU, motion estimation unit 122 may generate motion information for the PU. Motion compensation unit 124 may generate a predicted video block for the PU based the motion information and decoded samples of pictures other than the picture associated with the CU (e.g., reference pictures). In this disclosure, a predicted video block generated by motion compensation unit 124 may be referred to as an inter-predicted video block.

Slices may be I slices, P slices, or B slices. Motion estimation unit 122 and motion compensation unit 124 may perform different operations for a PU of a CU depending on whether the PU is in an I slice, a P slice, or a B slice. In an I slice, all PUs are intra predicted. Hence, if the PU is in an I slice, motion estimation unit 122 and motion compensation unit 124 do not perform inter prediction on the PU.

If the PU is in a P slice, the picture containing the PU is associated with a list of reference pictures referred to as "list 0." Each of the reference pictures in list 0 contains samples that may be used for inter prediction of other pictures. When motion estimation unit 122 performs the motion estimation operation with regard to a PU in a P slice, motion estimation unit 122 may search the reference pictures in list 0 for a reference block for the PU. The reference block of the PU may be a set of samples, e.g., a block of samples, that most closely corresponds to the samples in the video block of the PU. Motion estimation unit 122 may use a variety of metrics to determine how closely a set of samples in a reference picture corresponds to the samples in the video block of a PU. For example, motion estimation unit 122 may determine how closely a set of samples in a reference picture corresponds to the samples in the video block of a PU by sum of absolute difference (SAD), sum of square difference (SSD), or other difference metrics.

After identifying a reference block of a PU in a P slice, motion estimation unit 122 may generate a reference index that indicates the reference picture in list 0 containing the reference block and a motion vector that indicates a spatial displacement between the PU and the reference block. In various examples, motion estimation unit 122 may generate motion vectors to varying degrees of precision. For example, motion estimation unit 122 may generate motion vectors at one-quarter sample precision, one-eighth sample precision, or other fractional sample precision. In the case of fractional sample precision, reference block values may be interpolated from integer-position sample values in the reference picture. Motion estimation unit 122 may output the reference index and the motion vector as the motion information of the PU. Motion compensation unit 124 may generate a predicted video block of the PU based on the reference block identified by the motion information of the PU.

If the PU is in a B slice, the picture containing the PU may be associated with two lists of reference pictures, referred to as "list 0" and "list 1." In some examples, a picture containing a B slice may be associated with a list combination that is a combination of list 0 and list 1.

Furthermore, if the PU is in a B slice, motion estimation unit 122 may perform uni-directional prediction or bi-directional prediction for the PU. When motion estimation unit 122 performs uni-directional prediction for the PU, motion estimation unit 122 may search the reference pictures of list 0 or list 1 for a reference block for the PU. Motion estimation unit 122 may then generate a reference index that indicates the reference picture in list 0 or list 1 that contains the reference block and a motion vector that indicates a spatial displacement between the PU and the reference block. Motion estimation unit 122 may output the reference index, a prediction direction indicator, and the motion vector as the motion information of the PU. The prediction direction indicator may indicate whether the reference index indicates a reference picture in list 0 or list 1. Motion compensation unit 124 may generate the predicted video block of the PU based on the reference block indicated by the motion information of the PU.

When motion estimation unit 122 performs bi-directional prediction for a PU, motion estimation unit 122 may search the reference pictures in list 0 for a reference block for the PU and may also search the reference pictures in list 1 for another reference block for the PU. Motion estimation unit 122 may then generate reference indexes that indicate the reference pictures in list 0 and list 1 containing the reference blocks and motion vectors that indicate spatial displacements between the reference blocks and the PU. Motion estimation unit 122 may output the reference indexes and the motion vectors of the PU as the motion information of the PU. Motion compensation unit 124 may generate the predicted video block of the PU based on the reference blocks indicated by the motion information of the PU.

In some instances, motion estimation unit 122 does not output a full set of motion information for a PU to entropy encoding unit 116. Rather, motion estimation unit 122 may signal the motion information of a PU with reference to the motion information of another PU. For example, motion estimation unit 122 may determine that the motion information of the PU is sufficiently similar to the motion information of a neighboring PU. In this example, motion estimation unit 122 may indicate, in a syntax structure associated with the PU, a value that indicates to the video decoder 30 that the PU has the same motion information as the neighboring PU. In another example, motion estimation unit 122 may identify, in a syntax structure associated with the PU, a neighboring PU and a motion vector difference (MVD). The motion vector difference indicates a difference between the motion vector of the PU and the motion vector of the indicated neighboring PU. The video decoder 30 may use the motion vector of the indicated neighboring PU and the motion vector difference to determine the motion vector of the PU. By referring to the motion information of a first PU when signaling the motion information of a second PU, the video encoder 20 may be able to signal the motion information of the second PU using fewer bits.

As part of performing an encoding operation on a CU, intra prediction unit 126 may perform intra prediction on PUs of the CU. Intra prediction may provide spatial compression. When intra prediction unit 126 performs intra prediction on a PU, intra prediction unit 126 may generate prediction data for the PU based on decoded samples of other PUs in the same picture. The prediction data for the PU may include a predicted video block and various syntax elements. Intra prediction unit 126 may perform intra prediction on PUs in I slices, P slices, and B slices.

To perform intra prediction on a PU, intra prediction unit 126 may use multiple intra prediction modes to generate multiple sets of prediction data for the PU. When intra prediction unit 126 uses an intra prediction mode to generate a set of prediction data for the PU, intra prediction unit 126 may extend samples from video blocks of neighboring PUs across the video block of the PU in a direction and/or gradient associated with the intra prediction mode. The neighboring PUs may be above, above and to the right, above and to the left, or to the left of the PU, assuming a left-to-right, top-to-bottom encoding order for PUs, CUs, and treeblocks. Intra prediction unit 126 may use various numbers of intra prediction modes, e.g., 33 directional intra prediction modes, depending on the size of the PU.

Prediction processing unit 100 may select the prediction data for a PU from among the prediction data generated by motion compensation unit 124 for the PU or the prediction data generated by intra prediction unit 126 for the PU. In some examples, prediction processing unit 100 selects the prediction data for the PU based on rate/distortion metrics of the sets of prediction data.

If prediction processing unit 100 selects prediction data generated by intra prediction unit 126, prediction processing unit 100 may signal the intra prediction mode that was used to generate the prediction data for the PUs, e.g., the selected intra prediction mode. Prediction processing unit 100 may signal the selected intra prediction mode in various ways. For example, it may be probable that the selected intra prediction mode is the same as the intra prediction mode of a neighboring PU. In other words, the intra prediction mode of the neighboring PU may be the most probable mode for the current PU. Thus, prediction processing unit 100 may generate a syntax element to indicate that the selected intra prediction mode is the same as the intra prediction mode of the neighboring PU.

As discussed above, the video encoder 20 may include inter-layer prediction unit 128. Inter-layer prediction unit 128 is configured to predict a current block (e.g., a current block in the EL) using one or more different layers that are available in SHVC (e.g., a base or reference layer). Such prediction may be referred to as inter-layer prediction. Inter-layer prediction unit 128 utilizes prediction methods to reduce inter-layer redundancy, thereby improving coding efficiency and reducing computational resource requirements. Some examples of inter-layer prediction include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion information of the base layer to predict motion in the enhancement layer. Inter-layer residual prediction uses the residue of the base layer to predict the residue of the enhancement layer.

After prediction processing unit 100 selects the prediction data for PUs of a CU, residual generation unit 102 may generate residual data for the CU by subtracting (e.g., indicated by the minus sign) the predicted video blocks of the PUs of the CU from the video block of the CU. The residual data of a CU may include 2D residual video blocks that correspond to different sample components of the samples in the video block of the CU. For example, the residual data may include a residual video block that corresponds to differences between luminance components of samples in the predicted video blocks of the PUs of the CU and luminance components of samples in the original video block of the CU. In addition, the residual data of the CU may include residual video blocks that correspond to the differences between chrominance components of samples in the predicted video blocks of the PUs of the CU and the chrominance components of the samples in the original video block of the CU.

Prediction processing unit 100 may perform quadtree partitioning to partition the residual video blocks of a CU into sub-blocks. Each undivided residual video block may be associated with a different TU of the CU. The sizes and positions of the residual video blocks associated with TUs of a CU may or may not be based on the sizes and positions of video blocks associated with the PUs of the CU. A quadtree structure known as a "residual quad tree" (RQT) may include nodes associated with each of the residual video blocks. The TUs of a CU may correspond to leaf nodes of the RQT.

Transform processing unit 104 may generate one or more transform coefficient blocks for each TU of a CU by applying one or more transforms to a residual video block associated with the TU. Each of the transform coefficient blocks may be a 2D matrix of transform coefficients. Transform processing unit 104 may apply various transforms to the residual video block associated with a TU. For example, transform processing unit 104 may apply a discrete cosine transform (DCT), a directional transform, or a conceptually similar transform to the residual video block associated with a TU.

After transform processing unit 104 generates a transform coefficient block associated with a TU, quantization unit 106 may quantize the transform coefficients in the transform coefficient block. Quantization unit 106 may quantize a transform coefficient block associated with a TU of a CU based on a QP value associated with the CU.

The video encoder 20 may associate a QP value with a CU in various ways. For example, the video encoder 20 may perform a rate-distortion analysis on a treeblock associated with the CU. In the rate-distortion analysis, the video encoder 20 may generate multiple coded representations of the treeblock by performing an encoding operation multiple times on the treeblock. The video encoder 20 may associate different QP values with the CU when the video encoder 20 generates different encoded representations of the treeblock. The video encoder 20 may signal that a given QP value is associated with the CU when the given QP value is associated with the CU in a coded representation of the treeblock that has a lowest bitrate and distortion metric.

Inverse quantization unit 108 and inverse transform unit 110 may apply inverse quantization and inverse transforms to the transform coefficient block, respectively, to reconstruct a residual video block from the transform coefficient block. Reconstruction unit 112 may add the reconstructed residual video block to corresponding samples from one or more predicted video blocks generated by prediction processing unit 100 to produce a reconstructed video block associated with a TU. By reconstructing video blocks for each TU of a CU in this way, the video encoder 20 may reconstruct the video block of the CU.

After reconstruction unit 112 reconstructs the video block of a CU, filter unit 113 may perform a deblocking operation to reduce blocking artifacts in the video block associated with the CU. After performing the one or more deblocking operations, filter unit 113 may store the reconstructed video block of the CU in decoded picture buffer 114. Motion estimation unit 122 and motion compensation unit 124 may use a reference picture that contains the reconstructed video block to perform inter prediction on PUs of subsequent pictures. In addition, intra prediction unit 126 may use reconstructed video blocks in decoded picture buffer 114 to perform intra prediction on other PUs in the same picture as the CU.

Entropy encoding unit 116 may receive data from other functional components of the video encoder 20. For example, entropy encoding unit 116 may receive transform coefficient blocks from quantization unit 106 and may receive syntax elements from prediction processing unit 100. When entropy encoding unit 116 receives the data, entropy encoding unit 116 may perform one or more entropy encoding operations to generate entropy encoded data. For example, the video encoder 20 may perform a CAVLC operation, a CABAC operation, a variable-to-variable (V2V) length coding operation, a syntax-based context-adaptive binary arithmetic coding (SBAC) operation, a Probability Interval Partitioning Entropy (PIPE) coding operation, or another type of entropy encoding operation on the data. Entropy encoding unit 116 may output a bitstream that includes the entropy encoded data.

As part of performing an entropy encoding operation on data, entropy encoding unit 116 may select a context model. If entropy encoding unit 116 is performing a CABAC operation, the context model may indicate estimates of probabilities of particular bins having particular values. In the context of CABAC, the term "bin" is used to refer to a bit of a binarized version of a syntax element.

Multi-Layer Video Encoder

Figure 2B:
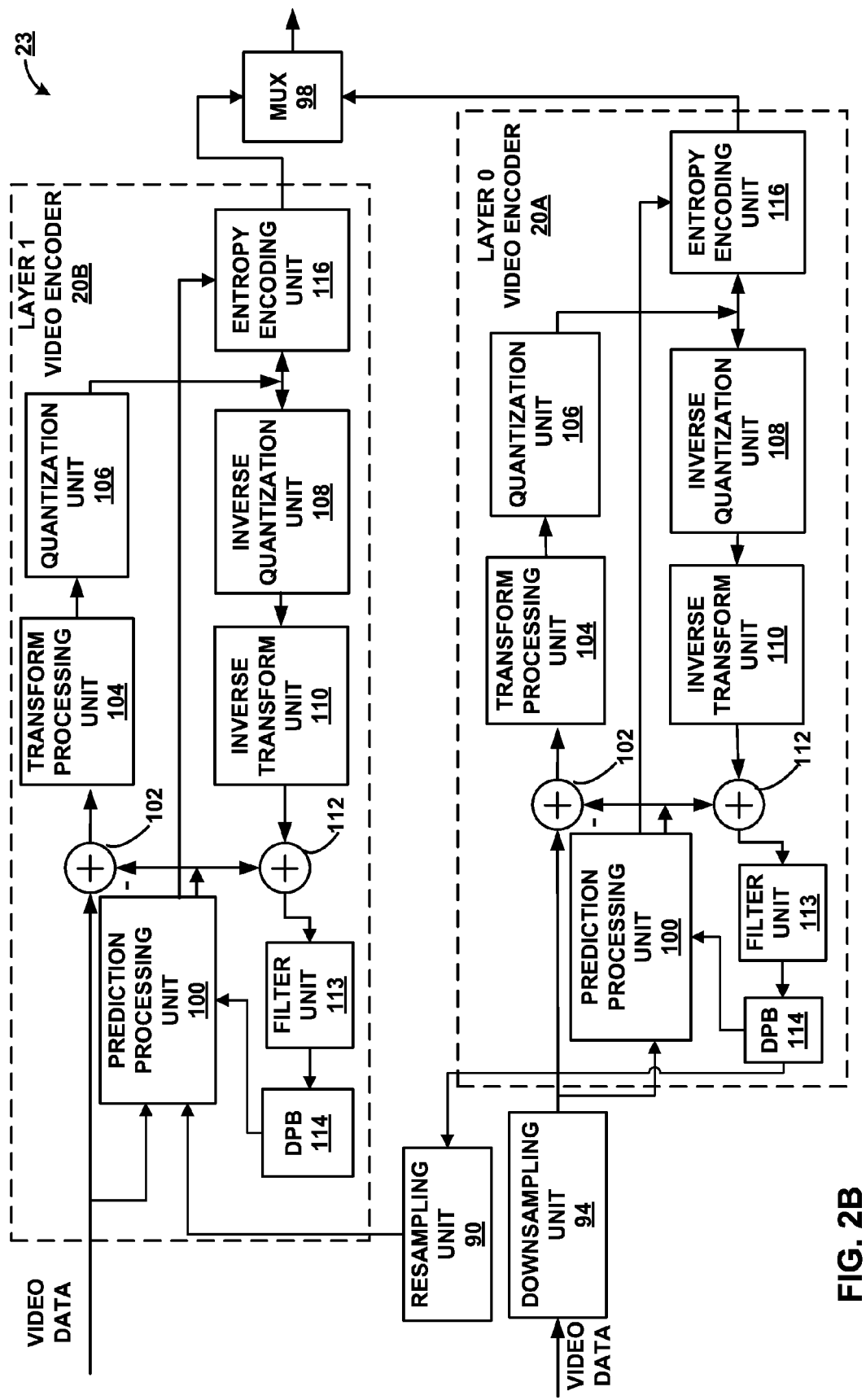
FIG. 2B is a block diagram illustrating an example of a video encoder that may implement techniques in accordance with aspects described in this disclosure.

FIG. 2B is a block diagram illustrating an example of a multi-layer video encoder 23 (also simply referred to as video encoder 23) that may implement techniques in accordance with aspects described in this disclosure. The video encoder 23 may be configured to process multi-layer video frames, such as for SHVC and MV-HEVC. Further, the video encoder 23 may be configured to perform any or all of the techniques of this disclosure.

The video encoder 23 includes a video encoder 20A and video encoder 20B, each of which may be configured as the video encoder 20 and may perform the functions described above with respect to the video encoder 20. Further, as indicated by the reuse of reference numbers, the video encoders 20A and 20B may include at least some of the systems and subsystems as the video encoder 20. Although the video encoder 23 is illustrated as including two video encoders 20A and 20B, the video encoder 23 is not limited as such and may include any number of video encoder 20 layers. In some embodiments, the video encoder 23 may include a video encoder 20 for each picture or frame in an access unit. For example, an access unit that includes five pictures may be processed or encoded by a video encoder that includes five encoder layers. In some embodiments, the video encoder 23 may include more encoder layers than frames in an access unit. In some such cases, some of the video encoder layers may be inactive when processing some access units.

In addition to the video encoders 20A and 20B, the video encoder 23 may include an resampling unit 90. The resampling unit 90 may, in some cases, upsample a base layer of a received video frame to, for example, create an enhancement layer. The resampling unit 90 may upsample particular information associated with the received base layer of a frame, but not other information. For example, the resampling unit 90 may upsample the spatial size or number of pixels of the base layer, but the number of slices or the picture order count may remain constant. In some cases, the resampling unit 90 may not process the received video and/or may be optional. For example, in some cases, the prediction processing unit 100 may perform upsampling. In some embodiments, the resampling unit 90 is configured to upsample a layer and reorganize, redefine, modify, or adjust one or more slices to comply with a set of slice boundary rules and/or raster scan rules. Although primarily described as upsampling a base layer, or a lower layer in an access unit, in some cases, the resampling unit 90 may downsample a layer. For example, if during streaming of a video bandwidth is reduced, a frame may be downsampled instead of upsampled.

The resampling unit 90 may be configured to receive a picture or frame (or picture information associated with the picture) from the decoded picture buffer 114 of the lower layer encoder (e.g., the video encoder 20A) and to upsample the picture (or the received picture information). This upsampled picture may then be provided to the prediction processing unit 100 of a higher layer encoder (e.g., the video encoder 20B) configured to encode a picture in the same access unit as the lower layer encoder. In some cases, the higher layer encoder is one layer removed from the lower layer encoder. In other cases, there may be one or more higher layer encoders between the layer 0 video encoder and the layer 1 encoder of FIG. 2B.

In some cases, the resampling unit 90 may be omitted or bypassed. In such cases, the picture from the decoded picture buffer 114 of the video encoder 20A may be provided directly, or at least without being provided to the resampling unit 90, to the prediction processing unit 100 of the video encoder 20B. For example, if video data provided to the video encoder 20B and the reference picture from the decoded picture buffer 114 of the video encoder 20A are of the same size or resolution, the reference picture may be provided to the video encoder 20B without any resampling.

In some embodiments, the video encoder 23 downsamples video data to be provided to the lower layer encoder using the downsampling unit 94 before provided the video data to the video encoder 20A. Alternatively, the downsampling unit 94 may be a resampling unit 90 capable of upsampling or downsampling the video data. In yet other embodiments, the downsampling unit 94 may be omitted.

As illustrated in FIG. 2B, the video encoder 23 may further include a multiplexor (or mux) 98. The mux 98 can output a combined bitstream from the video encoder 23. The combined bitstream may be created by taking a bitstream from each of the video encoders 20A and 20B and alternating which bitstream is output at a given time. While in some cases the bits from the two (or more in the case of more than two video encoder layers) bitstreams may be alternated one bit at a time, in many cases the bitstreams are combined differently. For example, the output bitstream may be created by alternating the selected bitstream one block at a time. In another example, the output bitstream may be created by outputting a non-1:1 ratio of blocks from each of the video encoders 20A and 20B. For instance, two blocks may be output from the video encoder 20B for each block output from the video encoder 20A. In some embodiments, the output stream from the mux 98 may be preprogrammed. In other embodiments, the mux 98 may combine the bitstreams from the video encoders 20A, 20B based on a control signal received from a system external to the video encoder 23, such as from a processor on a source device including the source device 12. The control signal may be generated based on the resolution or bitrate of a video from the video source 18, based on a bandwidth of the link 16, based on a subscription associated with a user (e.g., a paid subscription versus a free subscription), or based on any other factor for determining a resolution output desired from the video encoder 23.

Video Decoder

Figure 3A:
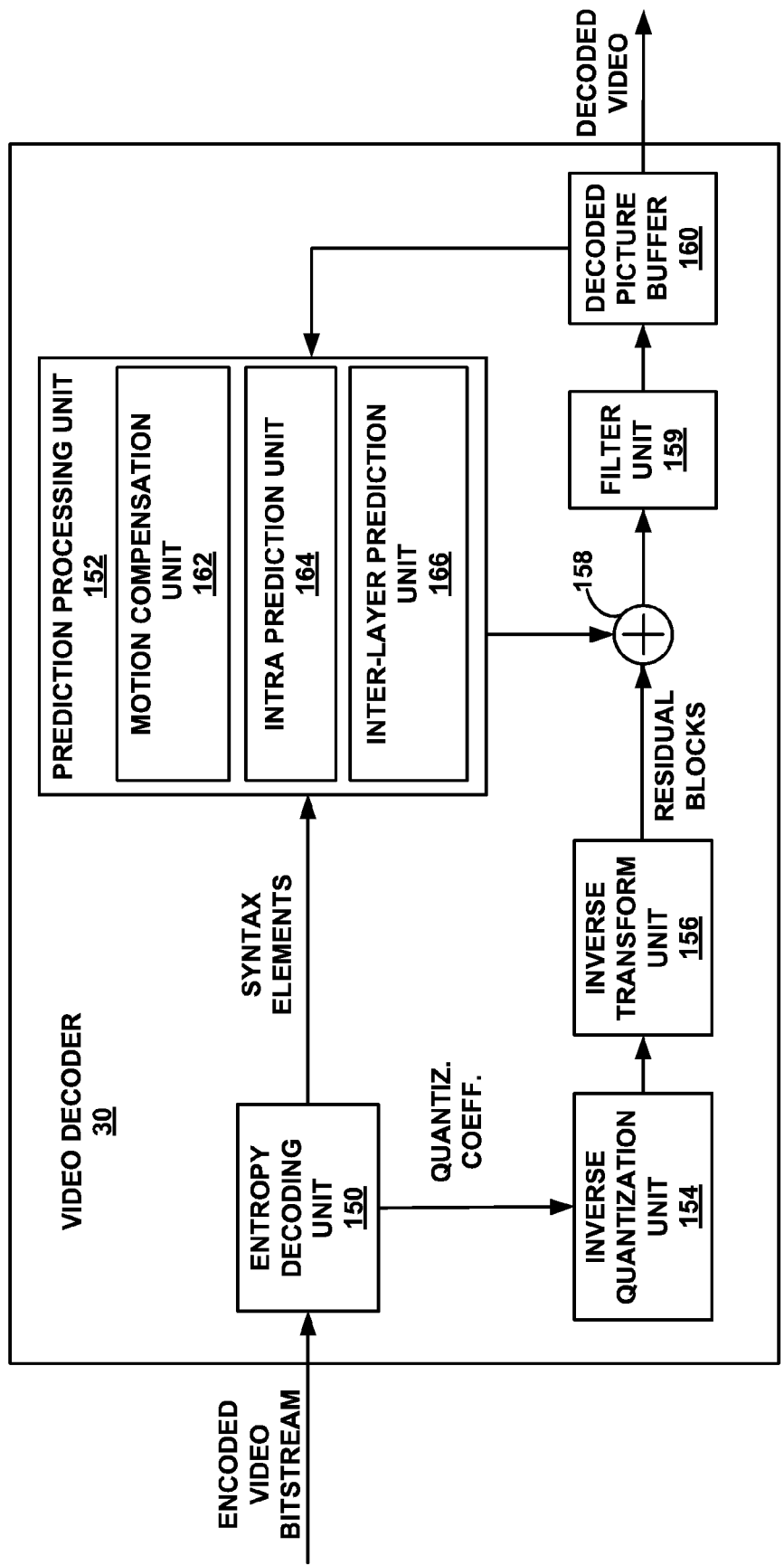
FIG. 3A is a block diagram illustrating an example of a video decoder that may implement techniques in accordance with aspects described in this disclosure.

FIG. 3A is a block diagram illustrating an example of the video decoder 30 that may implement techniques in accordance with aspects described in this disclosure. The video decoder 30 may be configured to process a single layer of a video frame, such as for HEVC. Further, the video decoder 30 may be configured to perform any or all of the techniques of this disclosure. In some examples, the techniques described in this disclosure may be shared among the various components of the video decoder 30. In some examples, additionally or alternatively, a processor (not shown) may be configured to perform any or all of the techniques described in this disclosure.

For purposes of explanation, this disclosure describes the video decoder 30 in the context of HEVC coding. However, the techniques of this disclosure may be applicable to other coding standards or methods. The example depicted in FIG. 3A is for a single layer codec. However, as will be described further with respect to FIG. 3B, some or all of the video decoder 30 may be duplicated for processing of a multi-layer codec.

In the example of FIG. 3A, the video decoder 30 includes a plurality of functional components. The functional components of the video decoder 30 include an entropy decoding unit 150, a prediction processing unit 152, an inverse quantization unit 154, an inverse transform unit 156, a reconstruction unit 158, a filter unit 159, and a decoded picture buffer 160. Prediction processing unit 152 includes a motion compensation unit 162, an intra prediction unit 164, and an inter-layer prediction unit 166. In some examples, the video decoder 30 may perform a decoding pass generally reciprocal to the encoding pass described with respect to video encoder 20 of FIG. 2A. In other examples, the video decoder 30 may include more, fewer, or different functional components.

The video decoder 30 may receive a bitstream that comprises encoded video data. The bitstream may include a plurality of syntax elements. When the video decoder 30 receives the bitstream, entropy decoding unit 150 may perform a parsing operation on the bitstream. As a result of performing the parsing operation on the bitstream, entropy decoding unit 150 may extract syntax elements from the bitstream. As part of performing the parsing operation, entropy decoding unit 150 may entropy decode entropy encoded syntax elements in the bitstream. Prediction processing unit 152, inverse quantization unit 154, inverse transform unit 156, reconstruction unit 158, and filter unit 159 may perform a reconstruction operation that generates decoded video data based on the syntax elements extracted from the bitstream.

As discussed above, the bitstream may comprise a series of NAL units. The NAL units of the bitstream may include video parameter set NAL units, sequence parameter set NAL units, picture parameter set NAL units, SEI NAL units, and so on. As part of performing the parsing operation on the bitstream, entropy decoding unit 150 may perform parsing operations that extract and entropy decode sequence parameter sets from sequence parameter set NAL units, picture parameter sets from picture parameter set NAL units, SEI data from SEI NAL units, and so on.

In addition, the NAL units of the bitstream may include coded slice NAL units. As part of performing the parsing operation on the bitstream, entropy decoding unit 150 may perform parsing operations that extract and entropy decode coded slices from the coded slice NAL units. Each of the coded slices may include a slice header and slice data. The slice header may contain syntax elements pertaining to a slice. The syntax elements in the slice header may include a syntax element that identifies a picture parameter set associated with a picture that contains the slice. Entropy decoding unit 150 may perform entropy decoding operations, such as CABAC decoding operations, on syntax elements in the coded slice header to recover the slice header.

As part of extracting the slice data from coded slice NAL units, entropy decoding unit 150 may perform parsing operations that extract syntax elements from coded CUs in the slice data. The extracted syntax elements may include syntax elements associated with transform coefficient blocks. Entropy decoding unit 150 may then perform CABAC decoding operations on some of the syntax elements.

After entropy decoding unit 150 performs a parsing operation on a non-partitioned CU, the video decoder 30 may perform a reconstruction operation on the non-partitioned CU. To perform the reconstruction operation on a non-partitioned CU, the video decoder 30 may perform a reconstruction operation on each TU of the CU. By performing the reconstruction operation for each TU of the CU, the video decoder 30 may reconstruct a residual video block associated with the CU.

As part of performing a reconstruction operation on a TU, inverse quantization unit 154 may inverse quantize, e.g., de-quantize, a transform coefficient block associated with the TU. Inverse quantization unit 154 may inverse quantize the transform coefficient block in a manner similar to the inverse quantization processes proposed for HEVC or defined by the H.264 decoding standard. Inverse quantization unit 154 may use a quantization parameter QP calculated by the video encoder 20 for a CU of the transform coefficient block to determine a degree of quantization and, likewise, a degree of inverse quantization for inverse quantization unit 154 to apply.

After inverse quantization unit 154 inverse quantizes a transform coefficient block, inverse transform unit 156 may generate a residual video block for the TU associated with the transform coefficient block. Inverse transform unit 156 may apply an inverse transform to the transform coefficient block in order to generate the residual video block for the TU. For example, inverse transform unit 156 may apply an inverse DCT, an inverse integer transform, an inverse Karhunen-Loeve transform (KLT), an inverse rotational transform, an inverse directional transform, or another inverse transform to the transform coefficient block. In some examples, inverse transform unit 156 may determine an inverse transform to apply to the transform coefficient block based on signaling from the video encoder 20. In such examples, inverse transform unit 156 may determine the inverse transform based on a signaled transform at the root node of a quadtree for a treeblock associated with the transform coefficient block. In other examples, inverse transform unit 156 may infer the inverse transform from one or more coding characteristics, such as block size, coding mode, or the like. In some examples, inverse transform unit 156 may apply a cascaded inverse transform.

In some examples, motion compensation unit 162 may refine the predicted video block of a PU by performing interpolation based on interpolation filters. Identifiers for interpolation filters to be used for motion compensation with sub-sample precision may be included in the syntax elements. Motion compensation unit 162 may use the same interpolation filters used by the video encoder 20 during generation of the predicted video block of the PU to calculate interpolated values for sub-integer samples of a reference block. Motion compensation unit 162 may determine the interpolation filters used by the video encoder 20 according to received syntax information and use the interpolation filters to produce the predicted video block.

If a PU is encoded using intra prediction, intra prediction unit 164 may perform intra prediction to generate a predicted video block for the PU. For example, intra prediction unit 164 may determine an intra prediction mode for the PU based on syntax elements in the bitstream. The bitstream may include syntax elements that intra prediction unit 164 may use to determine the intra prediction mode of the PU.

In some instances, the syntax elements may indicate that intra prediction unit 164 is to use the intra prediction mode of another PU to determine the intra prediction mode of the current PU. For example, it may be probable that the intra prediction mode of the current PU is the same as the intra prediction mode of a neighboring PU. In other words, the intra prediction mode of the neighboring PU may be the most probable mode for the current PU. Hence, in this example, the bitstream may include a small syntax element that indicates that the intra prediction mode of the PU is the same as the intra prediction mode of the neighboring PU. Intra prediction unit 164 may then use the intra prediction mode to generate prediction data (e.g., predicted samples) for the PU based on the video blocks of spatially neighboring PUs.

As discussed above, the video decoder 30 may also include inter-layer prediction unit 166. Inter-layer prediction unit 166 is configured to predict a current block (e.g., a current block in the enhancement layer) using one or more different layers that are available in SHVC (e.g., a base or reference layer). Such prediction may be referred to as inter-layer prediction. Inter-layer prediction unit 166 utilizes prediction methods to reduce inter-layer redundancy, thereby improving coding efficiency and reducing computational resource requirements. Some examples of inter-layer prediction include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion information of the base layer to predict motion in the enhancement layer. Inter-layer residual prediction uses the residue of the base layer to predict the residue of the enhancement layer. Each of the inter-layer prediction schemes is discussed below in greater detail.

Reconstruction unit 158 may use the residual video blocks associated with TUs of a CU and the predicted video blocks of the PUs of the CU, e.g., either intra prediction data or inter-prediction data, as applicable, to reconstruct the video block of the CU. Thus, the video decoder 30 may generate a predicted video block and a residual video block based on syntax elements in the bitstream and may generate a video block based on the predicted video block and the residual video block.

After reconstruction unit 158 reconstructs the video block of the CU, filter unit 159 may perform a deblocking operation to reduce blocking artifacts associated with the CU. After filter unit 159 performs a deblocking operation to reduce blocking artifacts associated with the CU, the video decoder 30 may store the video block of the CU in decoded picture buffer 160. Decoded picture buffer 160 may provide reference pictures for subsequent motion compensation, intra prediction, and presentation on a display device, such as display device 32 of FIG. 1A or 1B. For instance, the video decoder 30 may perform, based on the video blocks in decoded picture buffer 160, intra prediction or inter prediction operations on PUs of other CUs.

Multi-Layer Decoder

Figure 3B:
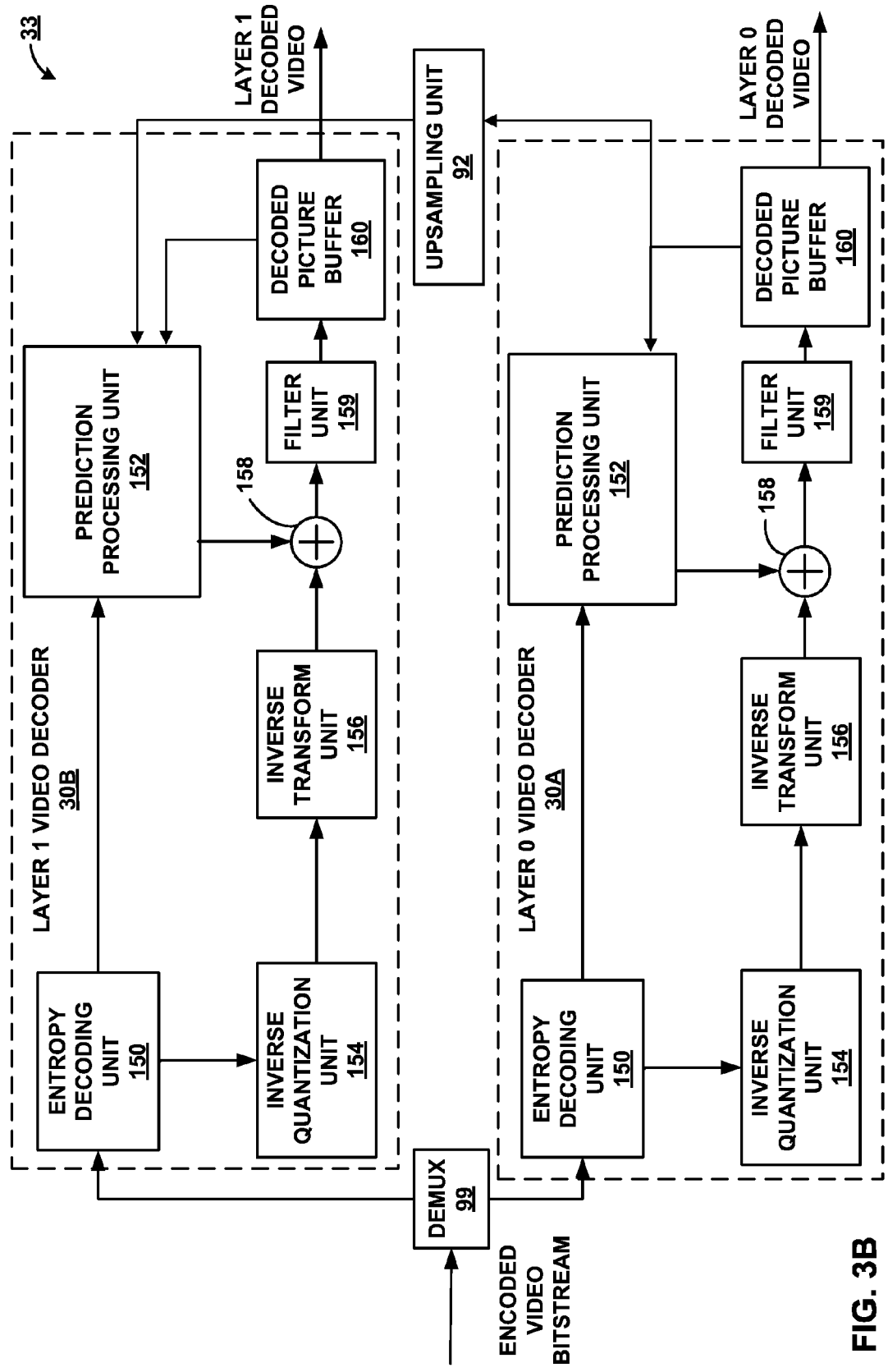
FIG. 3B is a block diagram illustrating an example of a video decoder that may implement techniques in accordance with aspects described in this disclosure.

FIG. 3B is a block diagram illustrating an example of a multi-layer video decoder 33 (also simply referred to as video decoder 33) that may implement techniques in accordance with aspects described in this disclosure. The video decoder 33 may be configured to process multi-layer video frames, such as for SHVC and multiview coding. Further, the video decoder 33 may be configured to perform any or all of the techniques of this disclosure.

The video decoder 33 includes a video decoder 30A and video decoder 30B, each of which may be configured as the video decoder 30 and may perform the functions described above with respect to the video decoder 30. Further, as indicated by the reuse of reference numbers, the video decoders 30A and 30B may include at least some of the systems and subsystems as the video decoder 30. Although the video decoder 33 is illustrated as including two video decoders 30A and 30B, the video decoder 33 is not limited as such and may include any number of video decoder 30 layers. In some embodiments, the video decoder 33 may include a video decoder 30 for each picture or frame in an access unit. For example, an access unit that includes five pictures may be processed or decoded by a video decoder that includes five decoder layers. In some embodiments, the video decoder 33 may include more decoder layers than frames in an access unit. In some such cases, some of the video decoder layers may be inactive when processing some access units.

In addition to the video decoders 30A and 30B, the video decoder 33 may include an upsampling unit 92. In some embodiments, the upsampling unit 92 may upsample a base layer of a received video frame to create an enhanced layer to be added to the reference picture list for the frame or access unit. This enhanced layer can be stored in the decoded picture buffer 160. In some embodiments, the upsampling unit 92 can include some or all of the embodiments described with respect to the resampling unit 90 of FIG. 2A. In some embodiments, the upsampling unit 92 is configured to upsample a layer and reorganize, redefine, modify, or adjust one or more slices to comply with a set of slice boundary rules and/or raster scan rules. In some cases, the upsampling unit 92 may be a resampling unit configured to upsample and/or downsample a layer of a received video frame The upsampling unit 92 may be configured to receive a picture or frame (or picture information associated with the picture) from the decoded picture buffer 160 of the lower layer decoder (e.g., the video decoder 30A) and to upsample the picture (or the received picture information). This upsampled picture may then be provided to the prediction processing unit 152 of a higher layer decoder (e.g., the video decoder 30B) configured to decode a picture in the same access unit as the lower layer decoder. In some cases, the higher layer decoder is one layer removed from the lower layer decoder. In other cases, there may be one or more higher layer decoders between the layer 0 decoder and the layer 1 decoder of FIG. 3B.

In some cases, the upsampling unit 92 may be omitted or bypassed. In such cases, the picture from the decoded picture buffer 160 of the video decoder 30A may be provided directly, or at least without being provided to the upsampling unit 92, to the prediction processing unit 152 of the video decoder 30B. For example, if video data provided to the video decoder 30B and the reference picture from the decoded picture buffer 160 of the video decoder 30A are of the same size or resolution, the reference picture may be provided to the video decoder 30B without upsampling. Further, in some embodiments, the upsampling unit 92 may be a resampling unit 90 configured to upsample or downsample a reference picture received from the decoded picture buffer 160 of the video decoder 30A.

As illustrated in FIG. 3B, the video decoder 33 may further include a demultiplexor (or demux) 99. The demux 99 can split an encoded video bitstream into multiple bitstreams with each bitstream output by the demux 99 being provided to a different video decoder 30A and 30B. The multiple bitstreams may be created by receiving a bitstream and each of the video decoders 30A and 30B receives a portion of the bitstream at a given time. While in some cases the bits from the bitstream received at the demux 99 may be alternated one bit at a time between each of the video decoders (e.g., video decoders 30A and 30B in the example of FIG. 3B), in many cases the bitstream is divided differently. For example, the bitstream may be divided by alternating which video decoder receives the bitstream one block at a time. In another example, the bitstream may be divided by a non-1:1 ratio of blocks to each of the video decoders 30A and 30B. For instance, two blocks may be provided to the video decoder 30B for each block provided to the video decoder 30A. In some embodiments, the division of the bitstream by the demux 99 may be preprogrammed. In other embodiments, the demux 99 may divide the bitstream based on a control signal received from a system external to the video decoder 33, such as from a processor on a destination device including the destination device 14. The control signal may be generated based on the resolution or bitrate of a video from the input interface 28, based on a bandwidth of the link 16, based on a subscription associated with a user (e.g., a paid subscription versus a free subscription), or based on any other factor for determining a resolution obtainable by the video decoder 33.

Intra Random Access Point (IRAP) Pictures

Some video coding schemes may provide various random access points throughout the bitstream such that the bitstream may be decoded starting from any of those random access points without needing to decode any pictures that precede those random access points in the bitstream. In such video coding schemes, all pictures that follow a random access point in decoding order, except random access skipped leading (RASL) pictures, can be correctly decoded without using any pictures that precede the random access point. For example, even if a portion of the bitstream is lost during transmission or during decoding, a decoder can resume decoding the bitstream starting from the next random access point. Support for random access may facilitate, for example, dynamic streaming services, seek operations, channel switching, etc.

In some coding schemes, such random access points may be provided by pictures that are referred to as intra random access point (RAP) pictures. For example, a random access point associated with an enhancement layer IRAP picture in an enhancement layer ("layerA") that is contained in an access unit ("auA") may provide layer-specific random access such that for each reference layer ("layerB") of layerA (e.g., a reference layer being a layer that is used to predict layerA) having a random access point associated with a picture contained in an access unit ("auB") that is in layerB and precedes auA in decoding order (or a random access point contained in auA), the pictures in layerA that follow auA in decoding order (including those pictures located in auA), are correctly decodable without needing to decode any pictures in layerA that precede auA.

IRAP pictures may be coded using intra prediction (e.g., coded without referring to other pictures) and/or inter-layer prediction, and may include, for example, instantaneous decoder refresh (IDR) pictures, clean random access (CRA) pictures, and broken link access (BLA) pictures. When there is an IDR picture in the bitstream, all the pictures that precede the IDR picture in decoding order are not used for prediction by pictures that follow the IDR picture. When there is a CRA picture in the bitstream, the pictures that follow the CRA picture may or may not use pictures that precede the CRA picture in decoding order for prediction. Those pictures that follow the CRA picture in decoding order but use pictures that precede the CRA picture in decoding order may be referred to as RASL pictures. Another type of picture that can follow an IRAP picture in decoding order and precede the IRAP picture in output order is a random access decodable leading (RADL) picture, which may not contain references to any pictures that precede the IRAP picture in decoding order. RASL pictures may be discarded by the decoder if the pictures that precede the CRA picture are not available. A BLA picture indicates to the decoder that pictures that precede the BLA picture may not be available to the decoder (e.g., because two bitstreams are spliced together and the BLA picture is the first picture of the second bitstream in decoding order). An access unit (e.g., a group of pictures consisting of all the coded pictures associated with the same output time across multiple layers) containing a base layer picture (e.g., having a layer ID value of 0) that is an IRAP picture may be referred to as an IRAP access unit.

Intra Block Copy (Intra BC)

In video coding, a video coder (e.g., a video encoder or a video decoder) forms a predictive block. The video encoder determines a difference, referred to as a residual, between the predictive block and a current block (e.g., the block being predicted). The residual values form a residual block. The video decoder receives the residual block and adds the residual of the residual block to the predictive block to reconstruct the current block. In inter-prediction, the predictive block is in a different picture than the current block or is based on samples of a different picture and identified by a motion vector. In intra-prediction, the predictive block is formed from samples in the same picture as the current block and formed by an intra-prediction mode. With Intra Block Copy (Intra BC) prediction, the predictive block is in the same picture as the current block and identified by a block vector.

Figure 4:
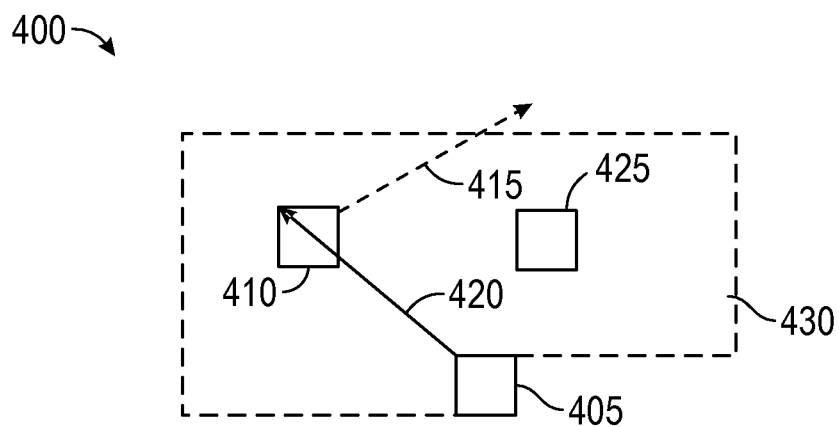
FIG. 4 is a diagram illustrating a conventional example of encoder searching using Intra Block Copy.

Intra BC has been included, for example, in RExt of HEVC. An example of a conventional Intra BC technique is shown in FIG. 4, wherein the current CU (or PU) 405 is predicted from an already decoded block 410 (i.e., a prediction block) of the current picture (or slice). Through use of a prediction signal 415, a decoder can reconstruct the current CU 405. In some instances, the prediction signal 415 may be reconstructed without in-loop filtering, including de-blocking and Sample Adaptive Offset (SAO).

A block vector 420 may indicate the prediction block 410 of the current CU/PU 405. A block vector predictor may be used to encode the block vector 420. The block vector 420 may be predicted and/or signaled at an integer level. For example, a block vector predictor may be set to (−w, 0) at the beginning of each coding tree block (CTB), where w is the width of the CU 405. The block vector predictor may be updated when a suitable prediction block 410 is found. The block vector predictor may further be updated to indicate a more recently coded prediction block 425 (i.e., a block closer to the current CU 405) that is coded with Intra BC mode. If a CU is not coded with Intra BC mode, the block vector predictor may remain unchanged. After block vector prediction, the block vector difference (i.e., the difference between the block vector 420 and the block vector predictor) is encoded using the motion vector difference coding method in HEVC. In some instances, only a predictor index, which indicates which block vector 420 to use, and the block vector 420 are signaled.

In some instances, a variety of block sizes may be supported., In the current RExt of HEVC, Intra BC may be enabled at both a CU level and a PU level. For the PU level Intra BC, a 2N×N and a N/2N PU partition is supported for all the CU sizes. In addition, when the CU is the smallest CU, a N×N PU partition is supported.

Currently, the search region 430 for Intra BC may comprise two parts: (1) a reconstructed part in the current coding tree unit (CTU); and (2) a reconstructed 64 columns of CTU height on the left of the current CTU.

Several documents, discussed below, have been presented which provide methods for fast encoder searching. However, because these methods apply Intra BC to each block within a search region 430, they may not be efficient when the search region 430 is large (e.g., an entire frame).

For example, in the document JCTVC-O0156, several methods were proposed to speed up an encoder search for Intra BC, including: block size restriction for Intra BC; neighboring block coding status/block size dependent 1-D/2D block vector restriction; and rate-distortion (RD) cost based and pre-analysis based early termination. The full citation for this document is JCTVC-O0156, Pang et al., "AhG5: Fast encoder search and search region restriction for intra block copying," Joint Collaborative Team on Video Coding (JCT-VC) of ITU-T SG 16 WP3 and ISO/IEC JTC 1/SC 29/WG 11, 15th Meeting: Geneva, CH, 23 Oct.-1 Nov. 2013.

For example, in the document JCTVC-O0245, early skipping methods were proposed to speed up the encoding search for Intra BC by skipping or limiting Intra BC in some cases. The full citation for this document is JCTVC-O0245, Do-Kyoung Kwon, "AHG5: Fast encoding using early skipping of Intra block copy (IntraBC) search," Joint Collaborative Team on Video Coding (JCT-VC) of ITU-T SG 16 WP3 and ISO/IEC JTC 1/SC 29/WG 11, 15th Meeting: Geneva, CH, 23 Oct.-1 Nov. 2013.

For example, in the document JCTVC-P0151, a method was proposed to provide fast encoder searching by reusing calculated sum of absolute difference (SAD) and skipping Intra BC in some cases. The full citation for this document is JCTVC-P0151, Pang et al., "Non-RCE3: Fast encoder search for RCE3 Subtest B.3," Joint Collaborative Team on Video Coding (JCT-VC) of ITU-T SG 16 WP3 and ISO/IEC JTC 1/SC 29/WG 11, 16th Meeting: San Jose, US, 9-17 Jan. 2014.

It is desirable to improve techniques for fast encoder search for Intra BC to become more efficient, not only when the search region is small (such as the current search region in RExt, discussed above). More particularly, it is desirable to improve the efficiency of such techniques when the search region is enlarged, e.g., larger than the current search region in RExt and/or covering the whole frame.

Techniques to speed up the encoder search for Intra BC are described herein. In an embodiment, the techniques are related to RExt, including the support of a "high" bit depth (e.g., more than 8 bits), and high chroma sampling format, including 4:4:4 and 4:2:2. The techniques described herein may also apply to screen content coding.

Figure 5:
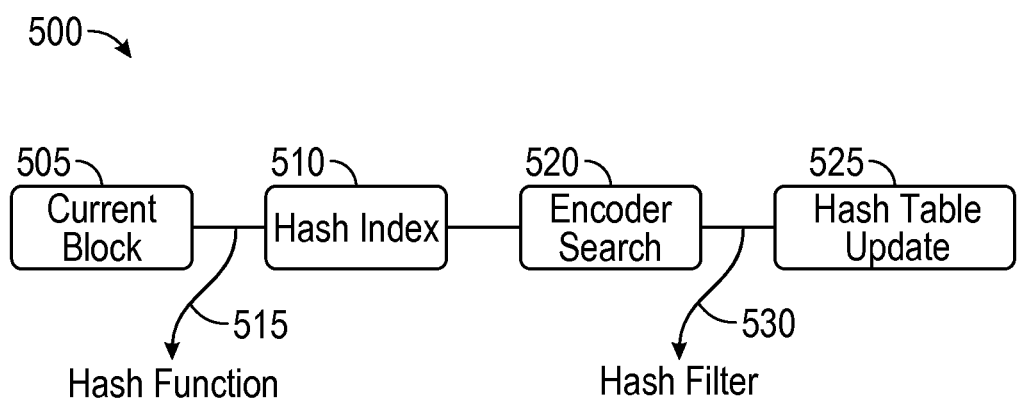
FIG. 5 illustrates an exemplary framework of hash-based fast encoder searching for Intra BC, in accordance with aspects described in this disclosure.

FIG. 5 illustrates an exemplary framework of hash-based fast encoder searching for Intra BC, in accordance with aspects described in this disclosure. In hash-based fast encoder searching, a hash table is constructed during the encoding process of each slice (or tile). In various embodiments, the hash table may be stored in a memory unit, and the memory unit may be operationally coupled to (i.e., in communication with) a processor. In some instances, the hash table may include one or more linked lists. In various embodiments, a current block 505 is mapped into a hash index 510 through use of a hash function 515. In other words, an encoder (e.g., the video encoder 20 or the video decoder 30) applies the hash function 515 to the current block 505 to determine the hash index 510 associated with the current block 505. In various embodiments, an encoder search 520 (i.e., a search operation performed by the encoder for a prediction block) may be restricted to the individual hash index 510 to which the current block 505 is determined to be mapped to. In other words, at 520, an encoder may restrict a search to the blocks previously mapped to the hash index 510 instead of searching an entire search region. In an embodiment, the hash index 510 may include a linked list of information indicative of blocks which have previously been mapped into the hash index 510. In some instances, such blocks may be referred to as candidate reference blocks because these blocks are candidates to be used as prediction blocks for predicting the current block 505. Because the encoder search 520 is restricted to candidate reference blocks, the encoder can efficiently search only those blocks which are similar to the current block 505, rather than unnecessarily searching other blocks which would be unsuitable as a prediction block.

After the current block 505 is reconstructed, the current block 505 may serve as a newly available candidate reference block. Newly available candidate reference blocks are added to the corresponding linked lists in the hash table according to their hash indices 510. In some embodiments, a hash filter 530 may be used to filter (i.e., remove) some of the newly available candidate reference blocks, and such newly available candidate reference blocks are not added into the hash table. The hash table may be updated 525 after the encoder search 520 (if no hash filter is used) or after applying the hash filter 530 (if a hash filter is used).

The hash function 515 may be used to map the current block 505 or any reference block (either original or reconstructed) to a hash index 510. The hash index 510 can be of a fixed bit-length, e.g., 12, 13, 14, 15, 16, . . . , or 24 bits, or the hash index 510 can be of a variable bit-length. There may be a variety of suitable hash functions 515 and/or methods for calculating the hash index 510.

For example, a hash index 510 may be a concatenation of the most significant bits (MSBs) of one or more values in the following set: {direct current (DC), $DC_s$, Grad, $Grad_s$, $DCT_{i,j}$, $DCT_{s,(i,j)}$}, wherein DC is the DC value, or average, of the current block, wherein $DC_s$ is the DC value of a first sub-block of the current block, wherein Grad is the gradient of the current block, wherein $Grad_s$ is the gradient of a second sub-block of the current block (wherein the second sub-block may comprise the first sub-block or may be a different sub-block of the current block), wherein $DCT_{i,j}$ is the $(i, j)^{th}$ DCT coefficient of the current block, and wherein $DCT_{s,(i,j)}$ is the $(i, j)^{th}$ DCT coefficient of a third sub-block of the current block (wherein the third sub-block may comprise the first or second sub-block or may be a different sub-block of the current block). In some embodiments, it may be possible to use values of luma and/or chroma samples to calculate these values (e.g., DC, $DC_s$, Grad, $Grad_s$, $DCT_{i,j}$, $DCT_{s,(i,j)}$).

In another example, a hash index 510 may be calculated using a cyclic redundancy check (CRC) with the inputs being all the pixels or selected pixels in the current block, or a function (e.g., quantization) of all the pixels or selected pixels in the block. In some embodiments, it is possible to use either luma or chroma samples as inputs, or to use both luma and chroma samples as the inputs.

The encoder search 520 may include calculating and/or evaluating a distance metric between the current block 505 and candidate reference blocks (i.e., blocks within the same picture (or slice of a picture) as the current block 505 that have previously been mapped to (i.e., associated with) the hash index 510. Some embodiments may involve using one or more of a variety of distance metrics, including sum of absolute difference (SAD), sum of squared error (SSE), and/or RD cost. The candidate reference block with the shortest distance may be selected as a prediction block of the current block 505. In an embodiment, only candidate reference blocks, stored in the hash table 525, having the same hash index 510 as the current block 505 are evaluated using a distance metric. In this way, searching for a prediction block using a hash-based search technique in accordance with the present disclosure may be more efficient than existing methods used in RExt of HEVC.

After the current block 505 is reconstructed, the newly available candidate reference blocks for predicting future blocks within the same picture (or same slice) are added into the corresponding linked list of the hash table 525 according to their hash indices. As noted above, in some embodiments, the hash filter 530 is used to filter out some candidate reference blocks and these candidate reference blocks may not be added to the hash table 525.

The hash filter 530 may utilize a variety of factors to filter candidate reference blocks. This filtering may exclude candidate reference blocks which may provide low or negligible utility for Intra BC, thus avoiding the cluttering of the hash table with indices for such candidate references blocks. In one example, if the average gradient of a candidate reference block is less than a threshold, then the candidate reference block is not added into the hash table 525. For example, the average gradient of the candidate reference block may correspond to the uniformity of pixel values within the candidate reference block. If the average gradient of the candidate reference block is less than the threshold, this may indicate that the pixel values in the candidate reference block, as a whole, are uniform or flat.

In another example, for N (e.g., N=3, 4, 5, 6, 7 . . . 32) predefined pixel values, if the percentage of pixels (e.g., either luma or chroma, or both luma and chroma) with values equal to any of these N values in the candidate reference block is lower than a threshold (e.g., 70%, 75%, 80%, 85%, 90%, 95%), then the candidate reference block is not added into the hash table 525. For example, if the percentage of pixels with values equal to any of these N values in the candidate reference block is less than the threshold, this may indicate that particular value or colors do not dominate the candidate reference block.

In yet another example, when the number of nodes in the linked list corresponding to one hash index 510 is larger than a threshold (e.g., 128), a particular candidate reference block is not added into the hash table 525.

In some instances, a hash table (e.g., hash table 525) may be designed to perform actions to improve efficiency. For example, a hash table may adjust hash indices to more accurately group candidate reference blocks. Hash indices can have fixed bit-lengths (e.g., 12, 13, 14, 15, 16, . . . or 24 bits) or have variable bit-lengths. In some instances, hash indices may increase or decrease in length to adjust groupings of candidate reference blocks. For example, hash indices may have bit-lengths of 12 bits. In the present example, if a greater subset of candidate reference blocks is associated with one hash index than other hash indices, the bit-length of the hash index and/or other hash indices may be adjusted to 14 bits to exclude some of the candidate reference blocks and thereby distribute the candidate reference blocks more evenly. Alternatively, the bit-lengths of hash indices may be decreased to include more candidate reference blocks.

Figure 6:
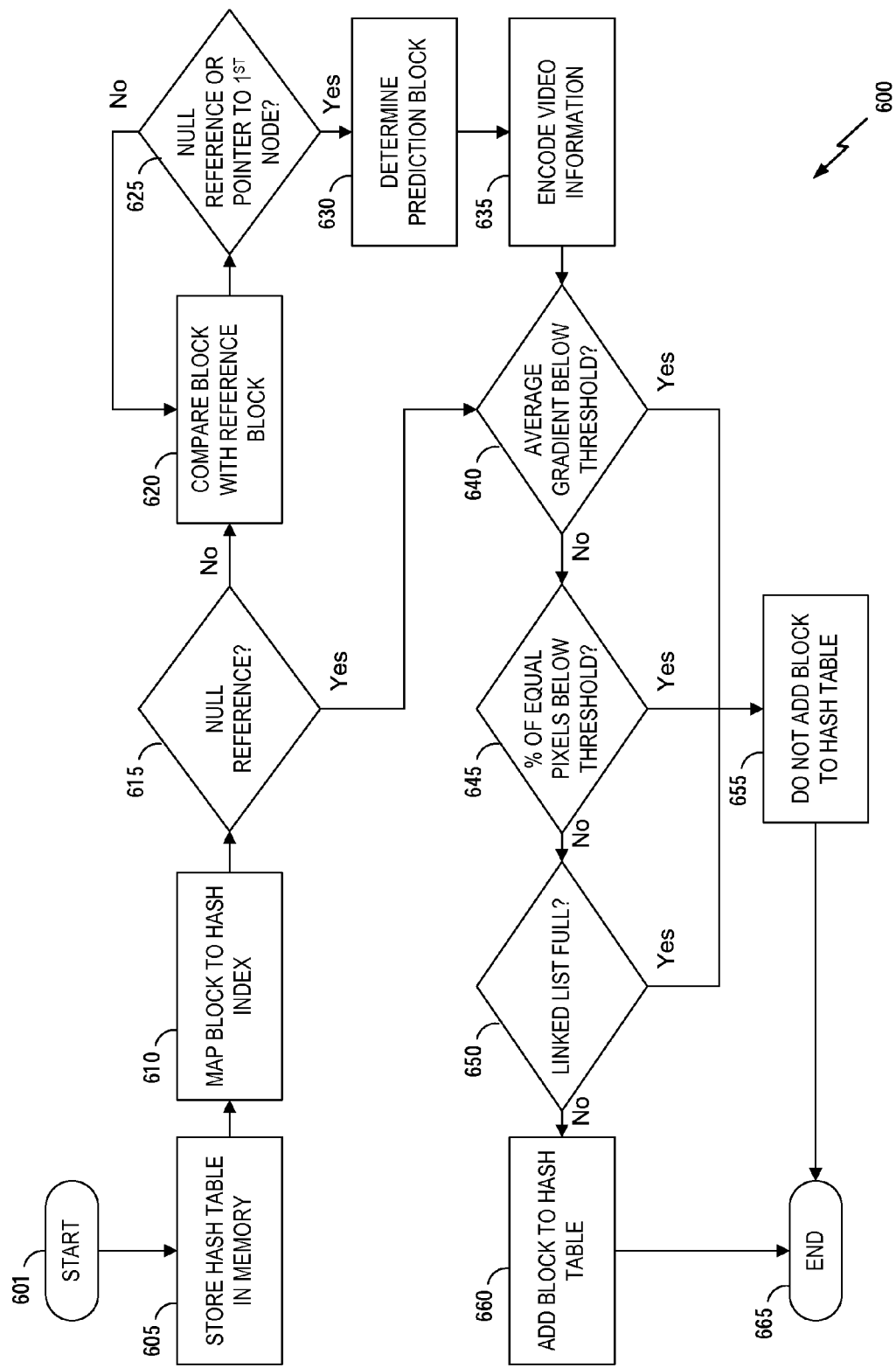
FIG. 6 is an illustration of an exemplary flowchart for encoding video information of a picture using hash-based encoder searching, in accordance with aspects described in this disclosure.

FIG. 6 is an illustration of an exemplary flowchart for encoding video information of a picture using hash-based encoder searching, in accordance with aspects described in this disclosure. The process 600 starts at block 601.

At block 605, the process 600 may involve an encoder storing a hash table in memory. A hash table may be any software or device suitable for implementing an associative array. A hash table may comprise one or more of the following: hash functions, hash indices, buckets, keys, and values. Given an input, or key, the hash table may apply a hash function to map the input to a hash index. The hash index may have an associated bucket. Each bucket be associated with one or more entries. For example, each entry may contain data indicative of one or more blocks of video information.

At block 610, the process 600 may involve mapping a block of video information to a hash index. For example, data indicative of a current block of video information may be inputted to the hash table. The encoder may apply a hash function to calculate a hash index based on the inputted data (i.e., the current block of video information). A variety of calculations may be suitable for use as a hash function, as discussed above.

The encoder may thus map the block of video information to one or more entries using the hash index and associated bucket. For example, an entry may provide information indicative of a candidate reference block. In this example, the information may be specification data of the contents of the candidate reference block. In some instances, one or more entries may be associated with one bucket, and the one or more entries may comprise a linked list. A linked list may be any associated set of information, and is composed of nodes. Nodes may include a value and a link to a next node. For example, a first entry may be associated with a link, or pointer, and the link may provide directional information to a second entry. In this example, the first and second entries, along with associated links, may comprise a linked list. A linked list may have any number of nodes. Each node may include an entry and a link to a next node.

In some instances, a bucket may comprise a link, and the link may either be a null reference or a pointer to a node. For example, if there are no stored values associated with a hash index, the associated bucket of the hash index may have a null reference.

At decision block 615, the process 600 may involve determining whether a link associated with the hash index is a null reference or a pointer to a node. If the link is not a null reference, the process 600 may involve proceeding to block 620. If the link is a null reference, the process 600 may involve proceeding to block 640.

As discussed above, the value field of a node may contain information indicative of a candidate reference block. By accessing this information, a current block of video information may be compared with individual references blocks.

At block 620, if the link of the hash index is not a null reference, the process 600 may involve comparing the current block with the candidate reference block of the node indicated by link of the hash index. As discussed above, the comparison may involve a calculation of distance between the current block and the candidate reference block.

In some instances, a linked list may continue until a link of a node is a null reference. In other instances, a linked list may continue until a link of a node points to the first node.

At decision block 625, the process 600 may involve determining whether the current node has a null reference or a pointer to the first node. If the current node does not have a null reference or a pointer to the first node, the process 600 may involve returning to block 620. If the current node has a null reference or a pointer to the first node, the process 600 may involve proceeding to block 630.

At block 630, if the current node has a null reference, the process 600 may involve determining (e.g., selecting) a prediction block from among the candidate reference blocks in the linked list. In some instances, the determination of a prediction block may be based on comparisons between the current block and candidate reference blocks in the linked list. For example, the candidate reference block in the linked list having the shortest distance from the current block may be selected as the prediction block.

At block 635, the process 600 may involve encoding the video information of the picture using the determined prediction block. For example, information received from the prediction block may be used in encoding slices of a picture or an entire picture containing the prediction block and the current block.

In some instances, information indicative of the current block may be added to the hash table. In this way, the current block may serve as a candidate reference block to later current blocks. However, in some instances, a current block may be required to pass through one or more filters before being added to the hash table. Three exemplary filters have been discussed above and are represented at decision blocks 640, 645, and 650.

At decision blocks 640, 645, and 650 after the current block has been reconstructed, or otherwise after it has been determined that there are no candidate reference blocks because the hash index is associated with a null reference at decision block 615, the process 600 may involve filtering the current block through three filters.

At decision block 640, the process 600 may involve determining whether an average gradient of the current block is below a non-uniformity threshold. If the average gradient is below the non-uniformity threshold, the process 600 may involve proceeding to block 655. If the average gradient meets or exceeds the non-uniformity threshold, the process 600 may involve proceeding to decision block 645.

At decision block 645, the process 600 may involve determining a percentage of pixels of the current block which have predetermined pixel values, and further determining whether the percentage is below a threshold percentage. For example, any number of predetermined pixel values may be used. If the percentage is below the threshold percentage, the process 600 may involve proceeding to block 655. If the percentage meets or exceeds the threshold percentage, the process 600 may involve proceeding to block 650.

At decision block 650, the process 600 may involve determining whether a number of nodes in the linked list is above a threshold number of nodes. If the number of nodes in the linked list is meets or exceeds the threshold number of nodes, the process 600 may involve proceeding to block 655. If the number of nodes is below the threshold number of nodes, the process 600 may involve proceeding to block 660.

At block 655, if the current block does not pass one or more of the filters, it is not added to the hash table.

At block 660, if the current block does pass the filters, it is added to the hash table. For example, information indicative of the current block may be added to a node of the linked list associated with the hash index of the current block.

The process 600 ends at block 665.

In some embodiments, a hash table may be cleared, or emptied, at the beginning of each slice (or tile, frame, etc.). However, in some embodiments, a hash table may not be emptied, for example, if the current slice is an inter-slice.

In an embodiment, the above-described hash-based searching may be applied to, but not limited to, certain block sizes, such as 8×8, 16×16, etc. The above-described hash-based searching method may be used separately or in combination with the current techniques on fast encoder search for Intra BC.

Other Considerations

Information and signals disclosed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, and algorithm steps described in connection with the embodiments disclosed herein may be implemented as electronic hardware, computer software, or combinations of both. To clearly illustrate this interchangeability of hardware and software, various illustrative components, blocks, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may be implemented in hardware, software, firmware, or any combination thereof. Such techniques may be implemented in any of a variety of devices such as general purposes computers, wireless communication device handsets, or integrated circuit devices having multiple uses including application in wireless communication device handsets and other devices. Any features described as devices or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software or hardware configured for encoding and decoding, or incorporated in a combined video encoder-decoder (CODEC). Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

Although the foregoing has been described in connection with various different embodiments, features or elements from one embodiment may be combined with other embodiments without departing from the teachings of this disclosure. For example, an encoder may have multiple of the discussed hash functions available for use, and may determine which hash function to use for each block of video information. A stored hash index may comprise multiple values, and a block of video information may be mapped to the stored hash index if the computed hash index for the block matches one or more of the values of the stored hash index. The discussed hash filters may instead be applied in combination with automatic addition of a current block to a hash table, i.e., a hash filter may be applied after information indicative of a block of video information is added to the hash table. For example, if a linked list becomes full, then hash filters may be applied at that point. Similar combinations of features are also contemplated including adding information indicative of a current block to a hash table after the information has been mapped to a hash index in the hash table; however, the combinations of features between the respective embodiments are not necessarily limited thereto.

Various embodiments of the disclosure have been described. These and other embodiments are within the scope of the following claims.

What is claimed is:

1. An apparatus for encoding video information of a picture, the apparatus comprising:
a memory unit configured to store a hash table that includes at least one hash index corresponding to reference blocks in the picture, the reference blocks being a subset of available blocks in the picture; and
a processor operationally coupled to the memory unit and configured to:
map a current block to a hash index in the hash table based on the application of a hash function to the current block;
identify, from the hash table, reference blocks that correspond to the hash index;
select a prediction block from among the reference blocks based on a comparison of the current block to the reference blocks; and
encode the video information using the selected prediction block.

2. The apparatus of claim 1, wherein the hash function creates a concatenation of most significant bits (MSBs) of one or more values in a set, the set comprising: a direct current (DC) value of the current block; a DC value of a sub-block of the current block; a gradient of the current block; a gradient of the sub-block of the current block; a discrete cosine transform (DCT) of the current block; and a DCT of the sub-block of the current block.

3. The apparatus of claim 1, wherein the hash function comprises a cyclic redundancy check (CRC) of one or more pixels in the current block.

4. The apparatus of claim 1, wherein the reference blocks comprise a linked list.

5. The apparatus of claim 4, wherein the processor is further configured to add the current block to the linked list in response to an average gradient value of the current block meeting or exceeding a non-uniformity threshold.

6. The apparatus of claim 4, wherein the processor is further configured to add the current block to the linked list in response to a percentage of pixels of the current block having predefined pixel values meeting or exceeding a threshold percentage.

7. The apparatus of claim 4, wherein the processor is further configured to add the current block to the linked list in response to a number of nodes in the linked list being less than a threshold number of nodes.

8. A method for encoding video information of a picture, the method comprising:
storing, in a memory unit, a hash table that includes at least one hash index corresponding to reference blocks in the picture, the reference blocks being a subset of available blocks in the picture;
mapping a current block to a hash index in the hash table based on the application of a hash function to the current block;
identifying, from the hash table, reference blocks that correspond to the hash index;
selecting a prediction block from among the reference blocks based on a comparison of the current block to the reference blocks; and
encoding the video information using the selected prediction block.

9. The method of claim 8, wherein the hash function creates a concatenation of most significant bits (MSBs) of one or more values in a set, the set comprising: a direct current (DC) value of the current block; a DC value of a sub-block of the current block; a gradient of the current block; a gradient of the sub-block of the current block; a discrete cosine transform (DCT) of the current block; and a DCT of the sub-block of the current block.

10. The method of claim 8, wherein the hash function comprises a cyclic redundancy check (CRC) of one or more pixels in the block.

11. The method of claim 8, wherein the reference blocks comprise a linked list.

12. The method of claim 11, further comprising adding the current block to the linked list in response to an average gradient value of the current block meeting or exceeding a non-uniformity threshold.

13. The method of claim 11, further comprising adding the current block to the linked list in response to a percentage of pixels of the current block having predefined pixel values meeting or exceeding a threshold percentage.

14. The method of claim 11, further comprising adding the current block to the linked list in response to a number of nodes in the linked list being less than a threshold number of nodes.

15. A non-transitory computer readable storage medium having stored thereon instructions that, when executed, cause a processor of a device to:
store in a memory unit a hash table for use in encoding video information of a picture, the hash table comprising at least one hash index corresponding to reference blocks in the picture, the reference blocks being a subset of available blocks in the picture;
map a current block to a hash index in the hash table based on the application of a hash function to the current block;
identify, from the hash table, reference blocks that correspond to the hash index;

select a prediction block from among the reference blocks based on a comparison of the current block to the reference blocks; and encode the video information using the selected prediction block.

16. The non-transitory computer readable storage medium of claim 15, wherein the hash function creates a concatenation of most significant bits (MSBs) of one or more values in a set, the set comprising: a direct current (DC) value of the current block; a DC value of a sub-block of the current block; a gradient of the current block; a gradient of the sub-block of the current block; a discrete cosine transform (DCT) of the current block; and a DCT of the sub-block of the current block.

17. The non-transitory computer readable storage medium of claim 15, wherein the hash function comprises a cyclic redundancy check (CRC) of one or more pixels in the current block.

18. The non-transitory computer readable storage medium of claim 15, wherein the reference blocks comprise a linked list.

19. The non-transitory computer readable storage medium of claim 18, further having stored thereon instructions that, when executed, cause the processor to add the current block to the linked list in response to an average gradient value of the current block meeting or exceeding a non-uniformity threshold.

20. The non-transitory computer readable storage medium of claim 18, further having stored thereon instructions that, when executed, cause the processor to add the current block to the linked list in response to a percentage of pixels of the current block having predefined pixel values meeting or exceeding a threshold percentage.

21. The non-transitory computer readable storage medium of claim 18, further having stored thereon instructions that, when executed, cause the processor to add the current block to the linked list in response to a number of nodes in the linked list being less than a threshold number of nodes.

22. A video coding device configured to encode video information of a picture, the video coding device comprising:

means for storing a hash table that includes at least one hash index corresponding to reference blocks in the picture, the reference blocks being a subset of available blocks in the picture;

means for mapping a current block to a hash index in the hash table based on the application of a hash function to the current block;

means for identifying, from the hash table, reference blocks that correspond to the hash index;

means for selecting a prediction block from among the reference blocks based on a comparison of the current block to the reference blocks; and means for encoding the video information using the selected prediction block.

23. The video coding device of claim 22, wherein the hash function creates a concatenation of most significant bits (MSBs) of one or more values in a set, the set comprising: a direct current (DC) value of the current block; a DC value of a sub-block of the current block; a gradient of the current block; a gradient of the sub-block of the current block; a discrete cosine transform (DCT) of the current block; and a DCT of the sub-block of the current block.

24. The video coding device of claim 22, wherein the hash function comprises a cyclic redundancy check (CRC) of one or more pixels in the block.

25. The video coding device of claim 22, wherein the reference blocks comprise a linked list.

26. The video coding device of claim 25, further comprising means for adding the current block to the linked list in response to an average gradient value of the current block meeting or exceeding a non-uniformity threshold.

27. The video coding device of claim 25, further comprising means for adding the current block to the linked list in response to a percentage of pixels of the current block having predefined pixel values meeting or exceeding a threshold percentage.

28. The video coding device of claim 25, further comprising means for adding the current block to the linked list in response to a number of nodes in the linked list being less than a threshold number of nodes.

* * * * *